United States Patent
Jain et al.

(10) Patent No.: US 10,225,162 B1
(45) Date of Patent: Mar. 5, 2019

(54) METHODS AND APPARATUS FOR ARRAY AGNOSTIC AUTOMATED STORAGE TIERING

(71) Applicant: EMC Corporation, Hopkinton, MA (US)

(72) Inventors: Anurag Jain, Murphy, TX (US); Sukesh Kumar Biddappa, Murphy, TX (US); Stephen A. Mendes, Wellesley, MA (US); Seema Tahaliyani, Allen, TX (US); Douglas J. Santoli, Southbury, CT (US); Barbara S Tzanakis, Chippewa Falls, WI (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 110 days.

(21) Appl. No.: 14/037,480

(22) Filed: Sep. 26, 2013

(51) Int. Cl.
*H04L 12/24* (2006.01)
*H04L 29/08* (2006.01)

(52) U.S. Cl.
CPC ...... *H04L 41/5041* (2013.01); *H04L 67/1097* (2013.01)

(58) Field of Classification Search
CPC ...... H04L 41/22; H04L 41/12; H04L 41/5041
USPC .......................................... 709/223; 711/117
See application file for complete search history.

(56) References Cited

U.S. PATENT DOCUMENTS

| | | | |
|---|---|---|---|
| 6,269,382 B1 * | 7/2001 | Cabrera | G06F 17/30082 |
| 7,194,538 B1 * | 3/2007 | Rabe | G06F 3/0605 709/220 |
| 7,225,308 B2 * | 5/2007 | Melament | G06F 11/1456 707/999.202 |
| 7,516,285 B1 | 4/2009 | Haynes et al. | |
| 7,685,261 B1 * | 3/2010 | Marinelli | H04L 43/0817 709/220 |
| 7,721,211 B1 * | 5/2010 | Yehuda | G06F 15/177 715/733 |
| 8,001,339 B1 * | 8/2011 | Holdman | G06F 3/0607 711/156 |
| 8,019,849 B1 * | 9/2011 | Lopilato | H04L 67/1097 709/203 |
| 8,055,622 B1 * | 11/2011 | Botes | G06F 17/30188 707/640 |
| 8,229,904 B2 * | 7/2012 | Claudatos | G06F 17/30085 707/694 |
| 8,402,118 B2 * | 3/2013 | Finnegan | G06F 3/0605 709/220 |

(Continued)

OTHER PUBLICATIONS

Unified Infrastructure Manager/ Provisioning Version 4.0, API Programmer's Guide, Aug. 15, 2013, 294 pages, EMC Corporation, Hopkinton, MA. (uploaded in two sections, a & b).

(Continued)

*Primary Examiner* — Mohamed A Wasel
*Assistant Examiner* — Binod J Kunwar
(74) *Attorney, Agent, or Firm* — Daly, Crowley Mofford & Durkee, LLP

(57) ABSTRACT

Methods and apparatus to provide, in a cloud infrastructure environment, an array agnostic automated storage tiering mechanism, wherein storage array types may be different. A user can select storage with an automated storage tiering policy while details of the storage are abstracted for the user. In embodiments, tiering policies determine a location for data based upon activity associated with the data.

21 Claims, 24 Drawing Sheets

(56) References Cited

U.S. PATENT DOCUMENTS

| | | | | |
|---|---|---|---|---|
| 8,463,923 | B2* | 6/2013 | Butt | H04L 41/22 370/254 |
| 8,549,130 | B2* | 10/2013 | Butt | H04L 41/5058 370/401 |
| 8,688,878 | B1* | 4/2014 | Dolan | G06F 3/061 710/33 |
| 8,725,878 | B1 | 5/2014 | Gillam et al. | |
| 8,838,931 | B1* | 9/2014 | Marshak | G06F 3/0605 710/74 |
| 8,863,124 | B1* | 10/2014 | Aron | G06F 9/45533 709/223 |
| 8,868,676 | B2* | 10/2014 | Acuna | H04L 67/1097 707/781 |
| 8,898,507 | B1* | 11/2014 | Crable | G06F 11/1484 714/4.11 |
| 8,918,493 | B1* | 12/2014 | Beach | G06F 9/5061 709/223 |
| 8,930,537 | B2* | 1/2015 | Basham | G06F 3/0605 709/226 |
| 8,935,493 | B1* | 1/2015 | Dolan | G06F 3/0649 711/117 |
| 8,935,742 | B2 | 1/2015 | Nice et al. | |
| 8,949,483 | B1* | 2/2015 | Martin | G06F 3/0653 710/15 |
| 8,954,393 | B1* | 2/2015 | Botes | G06F 17/30221 707/635 |
| 8,954,979 | B1 | 2/2015 | Myers et al. | |
| 8,966,172 | B2* | 2/2015 | Malwankar | G06F 3/0611 710/1 |
| 9,032,157 | B2* | 5/2015 | Ghai | G06F 12/0891 711/134 |
| 9,170,951 | B1 | 10/2015 | He et al. | |
| 9,195,453 | B1 | 11/2015 | Giammaria et al. | |
| 9,298,582 | B1 | 3/2016 | Zhang et al. | |
| 9,489,293 | B2* | 11/2016 | Kimmel | G06F 12/02 |
| 9,569,139 | B1* | 2/2017 | Mendes | G06F 3/0605 |
| 2002/0129230 | A1 | 9/2002 | Albright et al. | |
| 2003/0126242 | A1 | 7/2003 | Chang | |
| 2004/0199566 | A1* | 10/2004 | Carlson | G06F 17/30067 709/201 |
| 2004/0243699 | A1* | 12/2004 | Koclanes | H04L 29/06 709/224 |
| 2006/0112247 | A1* | 5/2006 | Ramany | G06F 3/0605 711/165 |
| 2006/0236061 | A1* | 10/2006 | Koclanes | G06F 3/0605 711/170 |
| 2006/0271677 | A1* | 11/2006 | Mercier | G06F 17/30197 709/224 |
| 2007/0239944 | A1* | 10/2007 | Rupanagunta | G06F 3/0613 711/147 |
| 2009/0178109 | A1 | 7/2009 | Nice et al. | |
| 2010/0115208 | A1* | 5/2010 | Logan | G06F 3/0611 711/147 |
| 2011/0185355 | A1 | 7/2011 | Chawla et al. | |
| 2012/0017043 | A1* | 1/2012 | Aizman | G06F 11/1076 711/114 |
| 2012/0072656 | A1* | 3/2012 | Archak | G06F 17/30132 711/104 |
| 2012/0079193 | A1* | 3/2012 | Sue | G06F 3/0605 711/114 |
| 2012/0151164 | A1* | 6/2012 | Nayak | G06F 11/2094 711/162 |
| 2012/0198251 | A1 | 8/2012 | Boldryev et al. | |
| 2012/0239739 | A1 | 9/2012 | Manglik et al. | |
| 2013/0124807 | A1* | 5/2013 | Nielsen | G06F 11/1438 711/162 |
| 2013/0346493 | A1 | 12/2013 | Martin | |
| 2014/0164621 | A1* | 6/2014 | Nakama | H04L 47/70 709/226 |

OTHER PUBLICATIONS

Unified Infrastructure Manager/ Provisioning Version 4.0, Configuration Requirements for Converged Hardware Systems, Aug. 15, 2013, 60 pages, EMC Corporation, Hopkinton, MA.

Unified Infrastructure Manager/ Provisioning Version 4.0, Online Help (Administration and User Guide), Aug. 15, 2013, 488 pages, EMC Corporation, Hopkinton, MA. (uploaded in two sections, a & b).

Unified Infrastructure Manager/ Provisioning Version 4.0, Preface, Revision History, Aug. 15, 2013, 2 pages, EMC Corporation, Hopkinton, MA.

Unified Infrastructure Manager/ Provisioning Version 4.0, Software Installation and Configuration Guide, Aug. 15, 2013, 36 pages, EMC Corporation, Hopkinton, MA.

Unified Infrastructure Manager/ Provisioning Version 4.0, Support Matrix, Aug. 15, 2013, 28 pages, EMC Corporation, Hopkinton, MA.

Unified Infrastructure Manager/ Provisioning Version 4.0, Troubleshooting Guide, Aug. 15, 2013, 122 pages, EMC Corporation, Hopkinton, MA.

White Paper, EMC Fast VP for Unified Storage Systems, A Detailed Review, Oct. 2011, 26 pages, EMC Corporation, Hopkinton, MA.

U.S. Appl. No. 13/629,017, filed Sep. 27, 2012, Crable, et al.

U.S. Appl. No. 13/536,705, filed Jun. 28, 2012, Beach et al.

U.S. Appl. No. 13/435,317, filed Mar. 30, 2012, Prabhakara, et al.

U.S. Appl. No. 13/435,146, filed Mar. 30, 2012, Crable.

Best Practices for Deploying VMware vCloud Director on Vblock Infrastructure Platforms, Sep. 2011, The Virtual Computing Environment Company, www.vce.com, 20 pages.

Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.

EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock Infrastructure Platforms Series 300 Architecture Overview, Version 2.4, Aug. 2011, The Virtual Computing Environment Company, www.vce.com, 74 pages.

Vblock™ Infrastructure Platforms 2010 Platforms Architecture Overview, Version 1.3, Nov. 2011, The Virtual Computing Environment Company, www.vce.com, 25 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com, 76 pages.

VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.

Office Action dated Aug. 8, 2013, U.S. Appl. No. 13/435,317, 18 pages.

Response to Office Action dated Aug. 8, 2013, U.S. Appl. No. 13/435,317, 11 pages.

Office Action dated Aug. 15, 2013, U.S. Appl. No. 13/435,146, 27 pages.

Response to Office Action dated Aug. 15, 2013, U.S. Appl. No. 13/435,146, 17 pages.

EMC Fast VP for Unified Storage Systems, A Detailed Review, White Paper, Oct. 2011, EMC Corporation, 26 pages.

U.S. Appl. No. 13/536,705 Response filed Jul. 21, 2014 8 pages.

U.S. Appl. No. 13/536,705 Office Action dated Mar. 27, 2014, 15 pages.

U.S. Appl. No. 14/037,474 Office Action dated Oct. 8, 2015, 12 pages.

(56) References Cited

OTHER PUBLICATIONS

Response dated Nov. 5, 2015 to Office Action dated Oct. 8, 2015; For U.S. Appl. No. 14/037,474; 3 pages.
Response dated May 16, 2016 to Office Action dated Feb. 17, 2016; For U.S. Appl. No. 14/037,474; 8 pages.
Final office action dated Jun. 30, 2016 for U.S. Appl. No. 14/037,474; 14 Pages.
Office Action dated Feb. 17, 2016; For U.S. Appl. No. 14/037,474; 9 pages.
U.S. Notice of Allowance dated Dec. 9, 2016 corresponding to U.S. Appl. No. 14/037,474; 12 Pages.
U.S. Appl. No. 14/534,416 Office Action dated Sep. 6, 2016, 30 pages.
Response filed on Nov. 29, 2016 to the Office Acton dated Sep. 6, 2016; for U.S. Appl. No. 14/534,416; 10 pages.
Notice of Allowance dated Feb. 3, 2017; for U.S. Appl. No. 14/534,416; 7 pages.

* cited by examiner

FIG. 14

| Tier | Move Down (GB) | Move Up (GB) | User (GB) | Consumed (GB) | Available (GB) |
|---|---|---|---|---|---|
| Extreme Performance | 35.07 | 0.00 | 272.53 | 245.48 | 27.05 |
| Performance | 928.81 | 35.07 | 1070.09 | 963.88 | 106.21 |
| Capacity | 0.00 | 963.88 | 3665.14 | 2008.92 | 1656.23 |

FCNCH094804140 - 3 Tier Pool : Storage Pool Properties

General | Disks | Advanced | Tiering

Tier Status
- Auto-Tiering: Scheduled — 1402
- Data Relocation Status: 1404 Ready
- Data to Move Down: 1406 963.88 GB
- Data to Move Up: 1408 998.95 GB
- Estimated Time for Data Relocation: 5.98 Hours — 1410

Relocation Schedule

Tier Details (shown top down from highest to lowest)

1400

OK  Apply  Cancel  Help

FIG. 17

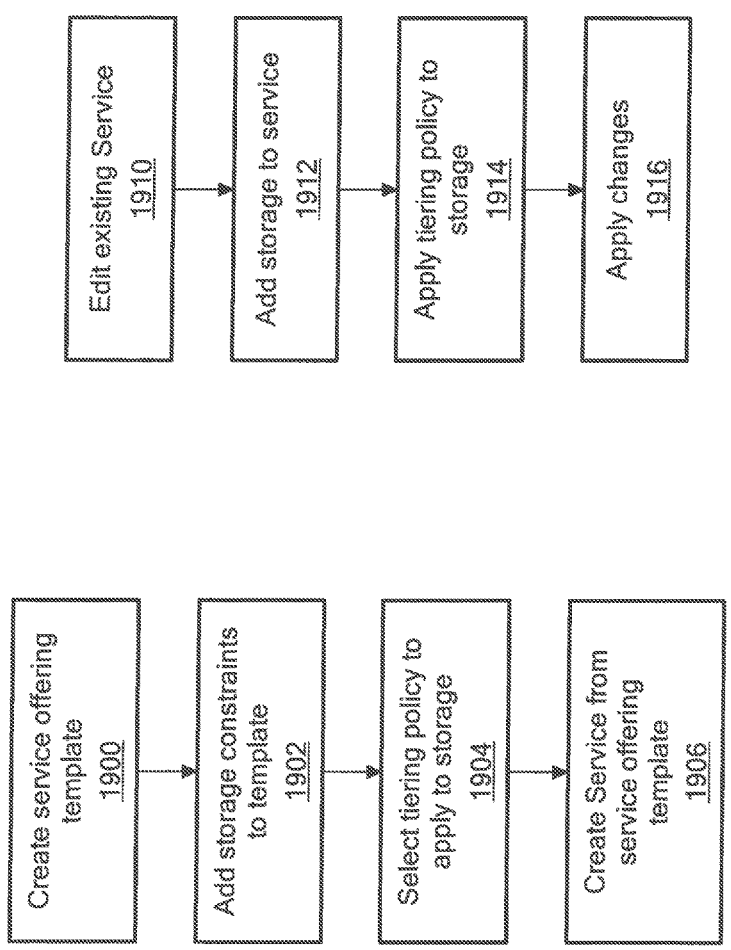

US 10,225,162 B1

METHODS AND APPARATUS FOR ARRAY AGNOSTIC AUTOMATED STORAGE TIERING

BACKGROUND

As is known in the art, cloud computing infrastructure systems contain a varied collection of servers ("hosts"), storage systems ("storage arrays"), networking devices, software modules and other components. Sets of hosts, networking devices, and storage arrays assembled in close proximity make up a unit of cloud infrastructure sometimes referred to as a pod ("pod") of devices. The pod components are physically connected via Ethernet networks.

The logical configuration of pod components and networks creates platforms that are sold or leased as services from a menu of predefined configuration offerings ("service offerings") for consumers of cloud computing. Offerings from vendors define the type, quantity, and quality of resources, such as "three servers with two network cards, 16 gigabytes of memory, four processors, and 20 gigabytes of boot disk space each, and a high performance 200 gigabyte storage volume shared between the servers." The instantiation of such an offering is considered an "infrastructure service". Defining services in this manner enables the consumer to use a selected portion of the host and storage resources within a given cloud infrastructure pod.

The instantiation of a service offering typically includes selected physical resources of the compute, storage, and compute layers into the logical concept of an "infrastructure service", as discussed above. A separate management layer can also exist in the cloud infrastructure environment that engages in mediation with the physical cloud resource layers to instantiate and manage service offerings into cloud infrastructure services based on the desired resource types, quantities, and quality of resource.

SUMMARY

In one aspect of the invention, a method comprises: in a cloud infrastructure environment having a compute layer, a network layer, a storage layer, and management layer, wherein the management layer has no knowledge of at least some of existing infrastructure services, selecting hosts containing host bus adapters and/or network adapters having unique identifiers, using the unique identifiers to analyze the storage layer for: storage groups having host initiators that match the unique identifiers of the host bus adaptors; and/or network file storage (NFS) exports exposed to the unique identifiers as client IP addresses.

The method can further include one or more of the following features: the unique identifiers comprise world wide port names (WWPNs) and/or Internet protocol (IP) network adapters configured with IP addresses, using storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service, through mediation with the compute layer, determining which storage volume and storage group should be used to boot the selected host, presence in the storage layer of an NFS export with a host IP address in a client list indicates the NFS export should be used as file storage in the cloud infrastructure service, the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, the hosts identified as potential clusters of hosts are validated for adherence to business rules in the management layer including: each host in the potential cluster recognizing the exact same shared storage volumes (SAN-based and/or NFS-based), and each host in the environment having identical network configuration including: the same number of host bus adapters with matching names, the same number of network adapters with matching names, and the same VLANs configured on each relative network adapter across hosts, one or more discovered cloud infrastructure services are adapted for and adopted into a data model of the management layer for continued service lifecycle management, and wherein any adopted cloud infrastructure service acts as if it had originally been fully configured and provisioned by the management layer into which it has been model adapted, the adopted service is analyzed for compatibility with an existing service offering in the cloud environment management layer, and if compatible, associated with the existing service offering, and/or a new service template is extrapolated from the structure and quality of service requirements of the adopted service and created as a new service offering in the cloud management layer.

In another aspect of the invention, an article comprises: a computer readable medium containing non-transitory stored instructions that enable a machine to perform: in a cloud infrastructure environment having a compute layer, a network layer, a storage layer, and management layer, wherein the management layer has no knowledge of at least some of existing infrastructure services, selecting hosts containing host bus adapters and/or network adapters having unique identifiers, and using the unique identifiers to analyze the storage layer for: storage groups having host initiators that match the unique identifiers of the host bus adaptors; and/or network file storage (NFS) exports exposed to the unique identifiers as client IP addresses.

The article can further include one or more of the following features: the unique identifiers comprise world wide port names (WWPNs) and/or Internet protocol (IP) network adapters configured with IP addresses, instructions for using storage ports in the storage groups with unique identifiers for the hosts to identify potential zones in a fabric of the storage area network (SAN), wherein the presence as zone members of one or more of the storage ports and one of the HBAs identified by one of the WWPNs in one of the zones indicates the zone can be in use as a SAN path in a cloud infrastructure service, instructions, through mediation with the compute layer, for determining which storage volume and storage group should be used to boot the selected host, presence in the storage layer of an NFS export with a host IP address in a client list indicates the NFS export should be used as file storage in the cloud infrastructure service, the storage volumes are potentially visible to and in use by other hosts in the cloud infrastructure environment, wherein the occurrence of at least one of the storage volumes being visible to and in use by more than one of the hosts in the cloud infrastructure environment indicates that the hosts form a cluster of hosts, the hosts identified as potential clusters of hosts are validated for adherence to business rules in the management layer including: each host in the potential cluster recognizing the exact same shared storage volumes (SAN-based and/or NFS-based), and each host in the environment having identical network configuration including:

the same number of host bus adapters with matching names, the same number of network adapters with matching names, and the same VLANs configured on each relative network adapter across hosts, one or more discovered cloud infrastructure services are adapted for and adopted into a data model of the management layer for continued service lifecycle management, and wherein any adopted cloud infrastructure service acts as if it had originally been fully configured and provisioned by the management layer into which it has been model adapted, and/or the adopted service is analyzed for compatibility with an existing service offering in the cloud environment management layer, and if compatible, associated with the existing service offering.

In a further aspect of the invention, a system comprises: a processor, and a memory coupled to the processor containing stored instructions to enable the system, in a cloud infrastructure environment having a compute layer, a network layer, a storage layer, and management layer, wherein the management layer has no knowledge of at least some of existing infrastructure services, to: select hosts containing host bus adapters and/or network adapters having unique identifiers, use the unique identifiers to analyze the storage layer for: storage groups having host initiators that match the unique identifiers of the host bus adaptors, and/or network file storage (NFS) exports exposed to the unique identifiers as client IP addresses.

In another aspect of the invention, a method comprises: transmitting information using a computer processor to display for user fields including converged hardware systems and available automated storage tiering policies for the converged hardware systems; and receiving a selection from the user for a first one of the available automated storage tiering policies for storage; wherein the automated storage tiering policies cover a plurality of storage types.

The method can further include one or more of the following features: the storage types are not displayed to the user, the automated storage tiering policies are associated with a service level, the tiering policies determine a location for data based upon activity associated with the data, using array specific commands to apply the automated storage tiering policies to the storage, and/or adding further storage to the converged hardware system and selecting a tiering policy for the further storage.

In a further aspect of the invention, a method comprises: in a cloud infrastructure environment having a compute layer, a network layer, a storage layer, and management layer, providing, using a computer processor, a first service having first network resources, first compute resources, and first storage resources; providing a second service having second network resources, second compute resources, and second storage resources; providing a management module coupled to the first and second services; providing the first storage resources with a first LUN having a first automated storage tiering policy with a first tier associated with the first automated storage tiering policy and the first LUN; and providing the second storage resources with a second LUN having a second automated storage tiering policy with a first tier associated with the second automated storage tiering policy and the second LUN, wherein the first and second LUNs are of different types.

The method can further include one or more of the following features: discovering the first and second automated storage policies for the first and second storage resources, information on the different types of the first and second LUNs are not displayed to the user, creating the first service from service offering, selecting a converged hardware system for the first service, loading array specific model and drivers for the first LUN, and/or using commands specific to the first LUN to apply the first automated storage tiering policy to the first LUN.

In a further aspect of the invention, an article comprises: at least one non-transitory computer readable medium having stored instructions that enable a machine to perform: in a cloud infrastructure environment having a compute layer, a network layer, a storage layer, and management layer, providing, using a computer processor, a first service having first network resources, first compute resources, and first storage resources; providing a second service having second network resources, second compute resources, and second storage resources; providing a management module coupled to the first and second services; providing the first storage resources with a first LUN having a first automated storage tiering policy with a first tier associated with the first automated storage tiering policy and the first LUN; and providing the second storage resources with a second LUN having a second automated storage tiering policy with a first tier associated with the second automated storage tiering policy and the second LUN, wherein the first and second LUNs are of different types.

The article can further include one or more of the following features: instructions for discovering the first and second automated storage policies for the first and second storage resources, information on the different types of the first and second LUNs are not displayed to the user, instructions for creating the first service from service offering, instructions for selecting a converged hardware system for the first service, instructions for loading array specific model and drivers for the first LUN, and/or instructions for using commands specific to the first LUN to apply the first automated storage tiering policy to the first LUN

BRIEF DESCRIPTION OF THE DRAWINGS

The foregoing features of this invention, as well as the invention itself, may be more fully understood from the following description of the drawings in which:

FIG. 14 shows an exemplary display to enable a user to select storage pool properties;

FIG. 17 shows an exemplary display to enable a user to see storage policies and tiers;

DETAILED DESCRIPTION

Figure 1:
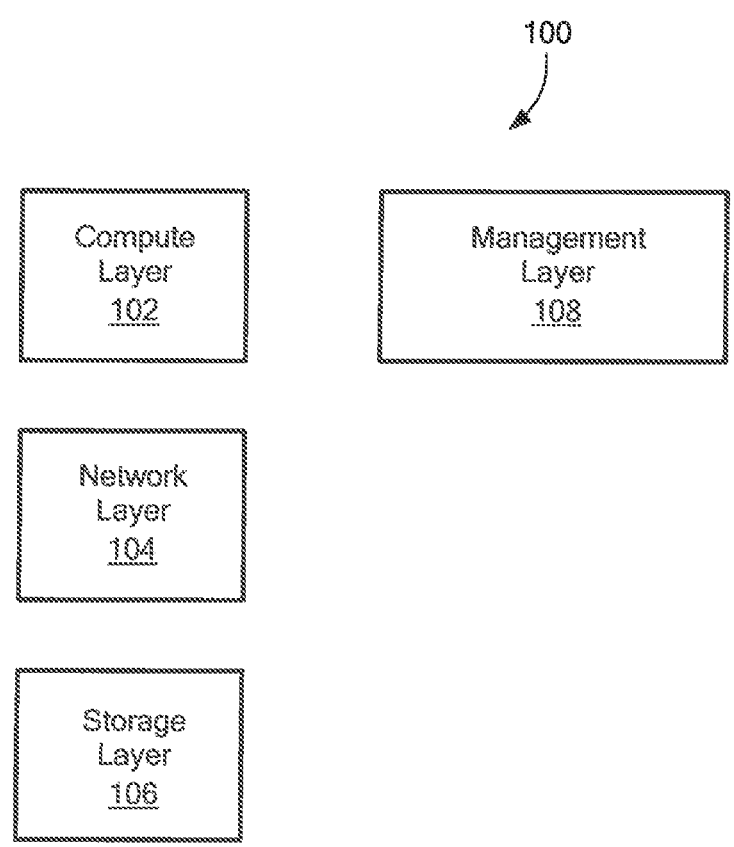
FIG. 1 is a high level schematic representation of a cloud storage system having automated service life management in accordance with exemplary embodiments of the invention.

Prior to describing exemplary embodiments of the invention, some introductory information is provided. Service discovery and adoption is the process of discovering, validating, and adapting existing cloud infrastructure into the management layer for the purpose of automating infrastructure service lifecycle management.

This process involves:
1) discovering existing compute, network, and storage layer components present in a cloud infrastructure pod;
2) analyzing the pod component configurations for relationships ("network paths") between the compute and storage layers in the storage area network ("SAN") and network file system ("NFS") configuration;
3) sorting selected parts of the environment into logical infrastructure services ("clusters of hosts") based on shared storage volumes;
4) validating potential clusters of hosts for the business requirements of the cloud infrastructure management layer;
5) adapting them to the model of the cloud infrastructure management layer, and/or
6) extrapolating from the adopted service a new service offering or associating it with a known service offering in the management layer.

Host Identification

The starting point of the service discovery and adoption methodology is identifying the unique compute layer networking component identifiers. The unique identifiers appear in the environment in the form of host bus adapters ("HBA") world wide port names ("WWPNs") for hosts configured with SAN storage, or in the form of IP addresses for hosts configured with network attached storage. A host can be configured with either or both storage types.

SAN Storage Path Discovery

The storage layer is analyzed to find host initiators in the storage array's storage group mapping configuration with WWPN identifiers matching those found at the compute layer. The term "host initiator" is analogous to the term "HBA" in the storage layer. Any combination of a host initiator WWPN and storage port WWPN in a storage mapping configuration container (such as a "storage group") is considered to be a potential SAN Zone.

The resulting set of potential zones is used in analyzing the network layer SAN fabric zoning configuration. If a zone found on a SAN fabric switch contains both the host initiator WWPN and the storage port WWPN of a potential zone, a true zone has been identified as in use by a potential infrastructure service in the environment. A cloud infrastructure service will typically have at least two zones configured per HBA, one in each SAN fabric, for a total of four zones per host.

If SAN-based host booting is employed (rather than local disk boot on the host), the process can engage in mediation with the compute layer to determine which storage volume in the SAN is used for booting the host. The storage array storage group containing this storage volume is considered the "boot storage group."

NFS Storage Path Discovery

In a similar manner, the starting point of the service adoption methodology for NFS configuration is identifying the unique NFS network IP address for each host in the cloud infrastructure pod. The NFS exports in the network attached storage devices are examined to find those with a matching IP address in their access client lists. Any NFS export with a matching IP address in its client lists is considered a candidate for adoption into an infrastructure service.

Host Storage Volume Collection

Storage volumes visible for a given host are collected from any volumes present in storage groups visible to the host via SAN zoning and/or from NFS exports visible to the host via IP routing as discovered during the SAN and NFS storage path discovery steps above.

Cluster Identification

After the storage volumes visible to each host have been identified, the hosts can be sorted into sets of hosts ("clusters") based on shared storage volumes. Any storage volume that is visible via SAN zoning or IP routing to more than one host is considered a potential shared data volume. These shared storage volumes are the fundamental criteria for determining clusters of hosts.

Cluster Validation

In order for a set of hosts to be identified safely as a valid cluster for continued lifecycle management, the hosts should satisfy cross-host validation criteria in the storage and compute layers. This validation is determined by the management layer and could include, but is not limited to, the following:

At the storage layer, it should be required that every host in the potential cluster has access to the exact same shared data volumes. In the case of SAN storage, each of these storage volumes should be mapped to the exact same host logical unit number ("LUN") for every host. This validation requirement does not pertain to host boot storage volumes, as they will have a one-to-one mapping between host and storage volume.

At the compute layer, hosts in a potential cluster should be configured with the exact same number of network interface cards ("NICs"), and each NIC should be configured in an identical manner relative to their ordering on the hosts. For example, if a given host has two configured NICs each named "eth0" and "eth1", all the other hosts in the cluster should have NICs each configured with the same NIC names and the exact same virtual local area networks ("VLANs") on each relative NIC. The term "relative" in this context implies that each NIC named "eth0" should have the same VLANs configured on each host. Likewise, "eth1"

could also be present on every host, possibly with different VLANs from "eth0", but "eth1" NIC should have an identical VLAN configuration across each host.

Modeling an Infrastructure Service

Once a set of hosts passes cluster validation, the resulting assemblage of compute layer hosts, network layer configuration, and storage layer resources is the logical representation of a cloud infrastructure service cluster, as extracted from an existing cloud infrastructure environment.

At this point, the discovered service can be adapted into an existing cloud management layer domain model. If the components of the discovered service satisfy the configuration and quality of service requirements of an existing service offering in the management layer, the discovered service can associated with an existing service offering. Otherwise, a service offering can be extrapolated from the discovered service by templatizing the computer, storage, and network components.

Once the discovered service has been adapted to the management layer model, it should be fully available for continued lifecycle management as if it were originally provisioned by the management layer.

FIG. 1 shows an exemplary cloud storage environment 100 having a compute layer 102, a network layer 104, a storage layer 106, and a management layer 108 having discovering, validating, and adapting cloud infrastructure into the cloud management layer. The environment may be referred to as a platform. It is understood that any practical number of platforms can be combined into a cloud storage environment.

The compute layer 102 comprises components, such as blade servers, chassis and network interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
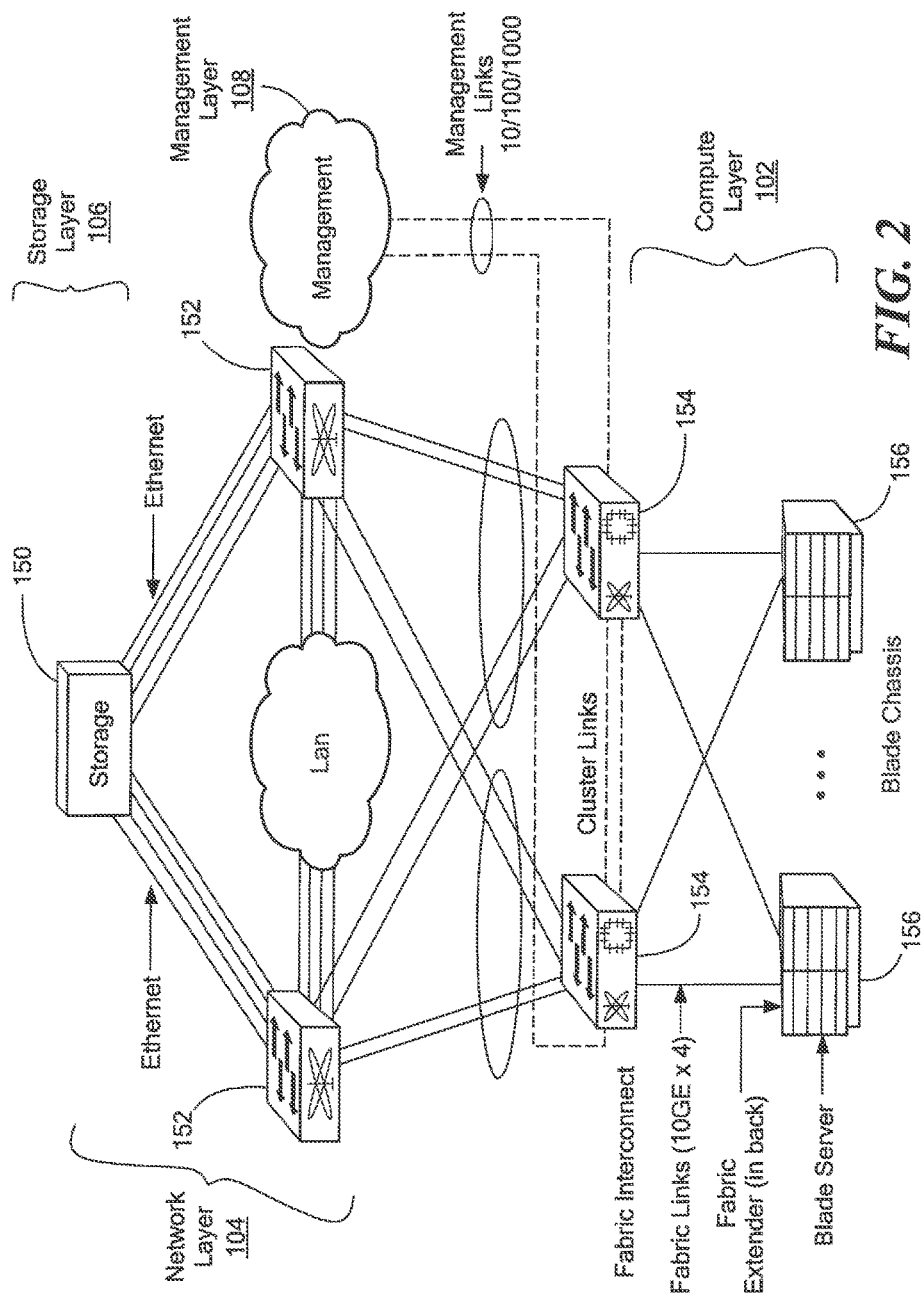
FIG. 2 is a schematic representation showing further detail of the cloud storage system of FIG. 1.

FIG. 2 shows further detail for the environment 100 of FIG. 1. The storage layer 106 can include storage components 150, such as CLARIION storage components from EMC Corporation of Hopkinton Mass. The network layer 104 can include a pair of switches 152, such as Nexus 5000 Series Ethernet Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
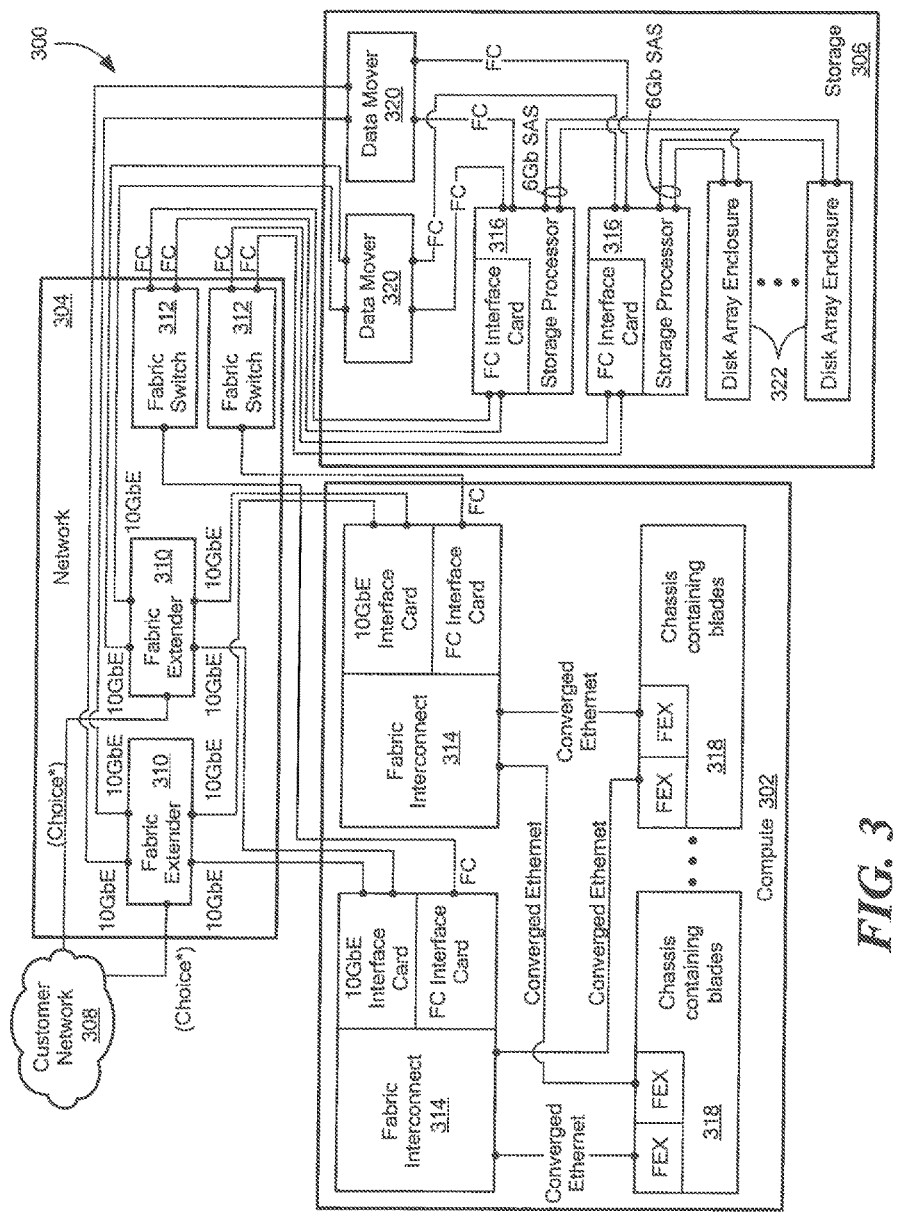
FIG. 3 is a schematic representation showing further detail of the cloud storage system if FIG. 2.
Figure 4:
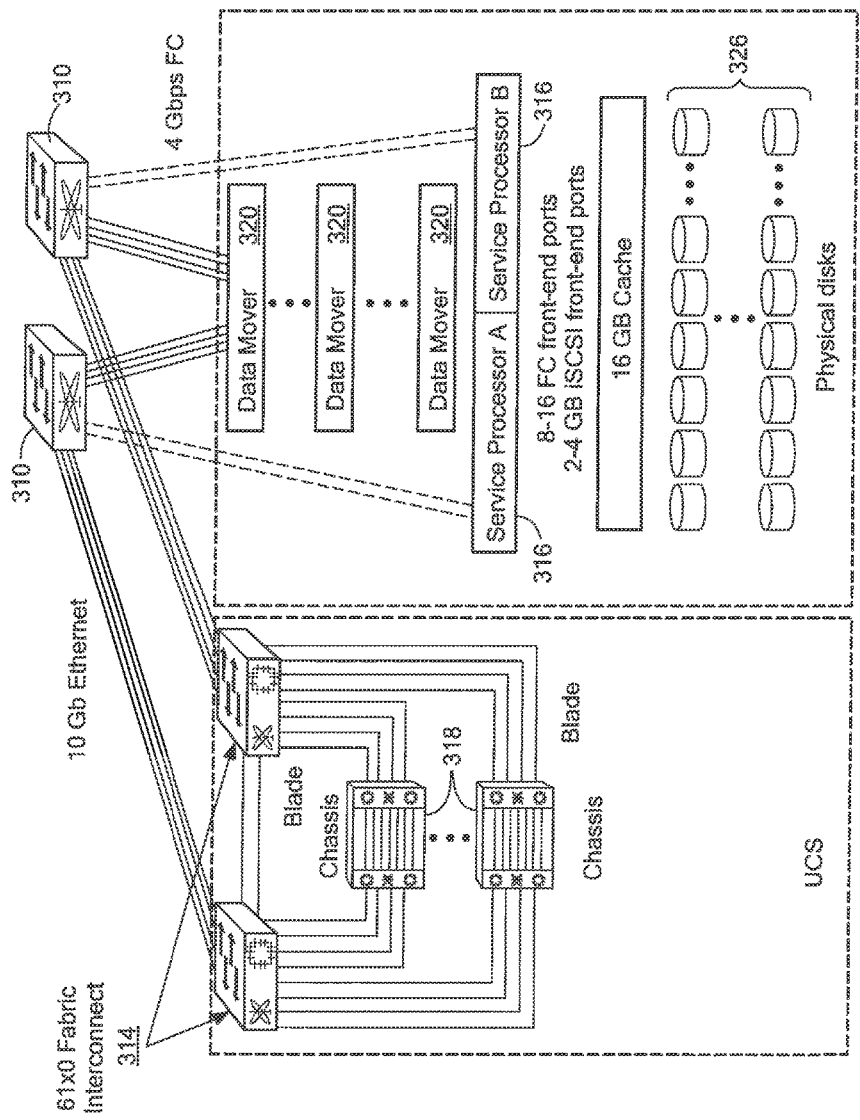
FIG. 4 is a schematic representation showing further detail of a storage layer of the cloud storage system of FIG. 3.

FIG. 3 shows further detail of an exemplary cloud environment having a compute layer 302, a network layer 304 and a storage layer 306. The network layer 304 is coupled to a customer network 308 in a manner known in the art. The network layer 304 includes switches 310 coupled to the customer network 308. The network layer 304 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports and 2 to 4 Data Mover compute notes containing Ethernet adaptors.

It is understood that a variety of other configurations having different interconnections and storage configuration can be provided to meet the needs of a particular application.

The management layer can include a number of applications to perform various functions for overall control, configuration, etc. of the various platform components. For example, management applications can include a virtualization function, such as VSPHERE/VCENTER, by VMware of Palto Alto, Calif. A further management application can be provided as part of the Unified Computing System (UCS) by Cisco. It is understood that the blade chassis and fabric interconnection can be considered part of the UCS. Another management application can includes a management interface, such as EMC Unisphere, to provide a flexible, integrated experience for managing existing storage systems, such as CLARIION and CELERRA storage devices from EMC. A further management application includes a platform element manager, such as unified infrastructure manager (UIM) by EMC, for managing the configuration, provisioning, and compliance of the platform.

It is understood that various vendor specific terminology, product name, jargon, etc., may be used herein. It is further understood that such vendor specific information or jargon is used to facilitate an understanding of embodiments of the invention and should not limit the invention in any way. Any specific vendor information should be construed to mean a generic product, function, or module.

Figure 5:
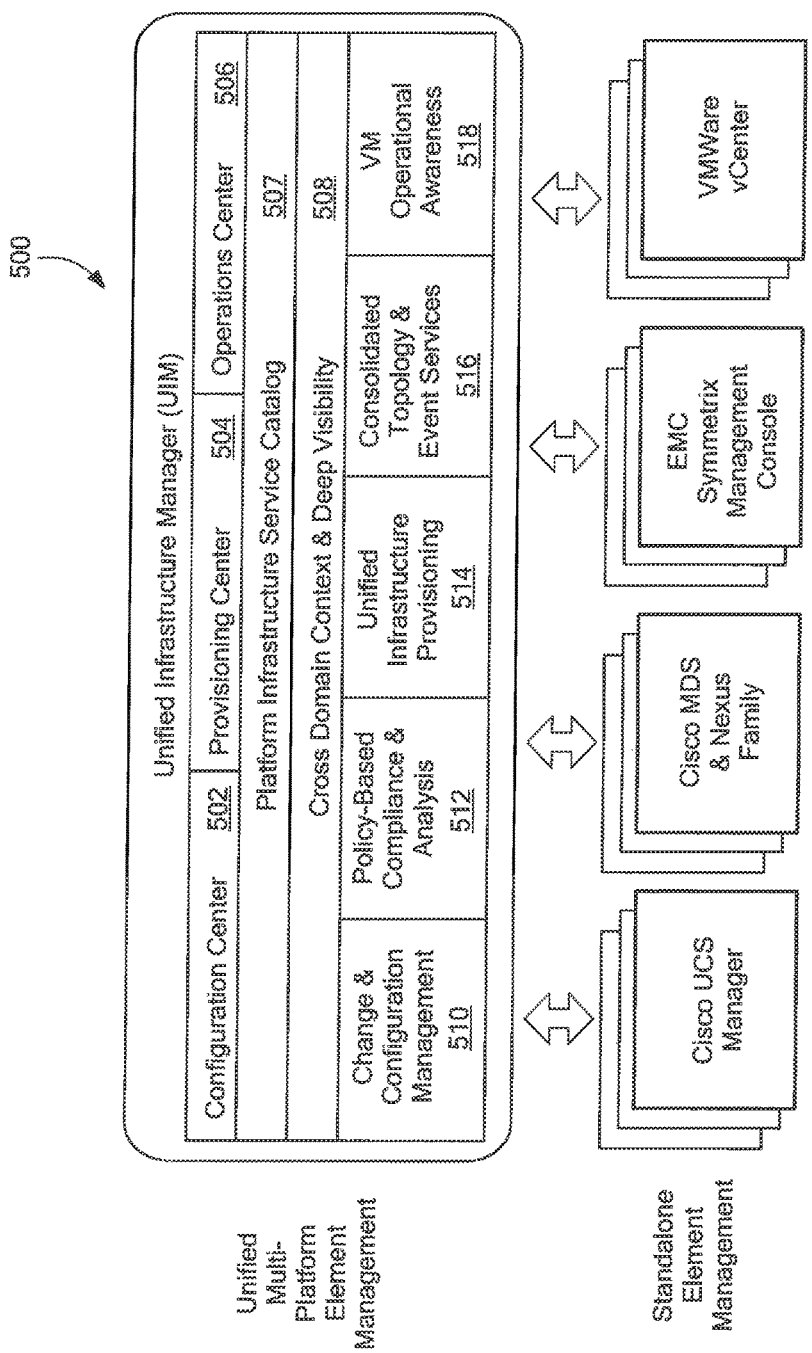
FIG. 5 is a schematic representation of a unified infrastructure manager (UIM) module.

FIG. 5 shows an exemplary unified infrastructure manager 500 having discovering, validating, and adapting cloud infrastructure. In an exemplary embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications. The unified infrastructure manager 500 performs platform deployment by abstracting the overall provisioning aspect of the platform(s) and offering granular access to platform components for trouble shooting and fault management.

Figure 6:
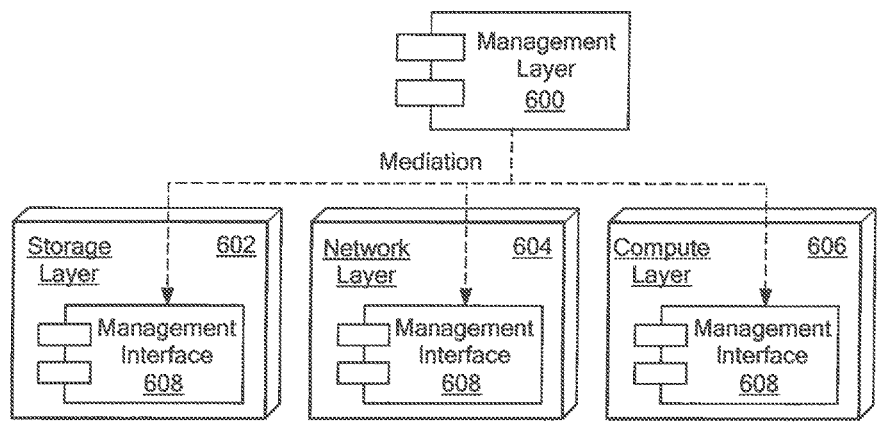
FIG. 6 is a schematic representation of layers having a management interface.

FIG. 6 shows a management/service layer 600 connected to a storage layer 602, a network layer 604, and a compute layer 606, each having a respective management interface layer 608. In general, the management layer 600 uses device native interfaces provided by the equipment vendor to translate desired configuration settings into actual configuration settings. The native interface is directly related to the equipment vendor. In one embodiment, the service management layer 600 uses native command line interfaces (CLI) provided by software components the equipment manufacturer supplies or using application programming interfaces (APIs) to send commands to the management interface using messaging protocols. The API defines a programming language binding for executing configuration instructions. In both cases the equipment manufacturer supplies computer software that drives the management interface. In the case of the CLI, the commands are either executed on the operating system hosting the management layer and communicating to the device over proprietary protocols or run on the operating system hosting the device management interface. CLIs typically take properties sets and return results in textual or encoded formats such as XML.

EXAMPLE naviseccli -h 192.168.101.40 bind r5 0 -rg 0 -cap 20 -rc 1 -sp a -sq gb -wc 1

APIs provide a native computer programming language binding that can be executed from the native computer programming language. Java is a widely used language in computer programming and many vendors provide java language libraries and examples to execute commands against the management interface of their devices.

Figure 7:
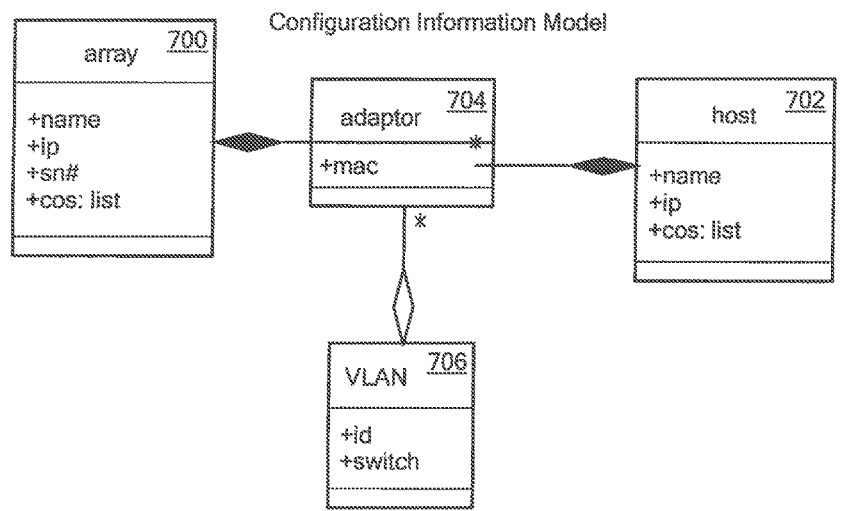
FIG. 7 is a representation of a configuration information model.

FIG. 7 shows a model of the physical information stored within the management layer of the components in FIG. 1. An array model component 700 contains properties that describe the pod and management information for the array. A host model component 702 contains properties that describe the pod and management information for the host. Instances of an adaptor model component 704 are associated with arrays and hosts to indicate the array or host has an Ethernet adaptor. Hosts and arrays may have many adaptors. Adaptors 704 may have additional detailed properties that indicate the identifier for the adaptor and network profiles indicating the IP addresses and MAC addresses of the adaptor. Instances of VLAN model components 706 are loosely associated with the adaptors representing the logical network connectivity between the adaptor and the other adaptors associated to that VLAN.

Figure 8:
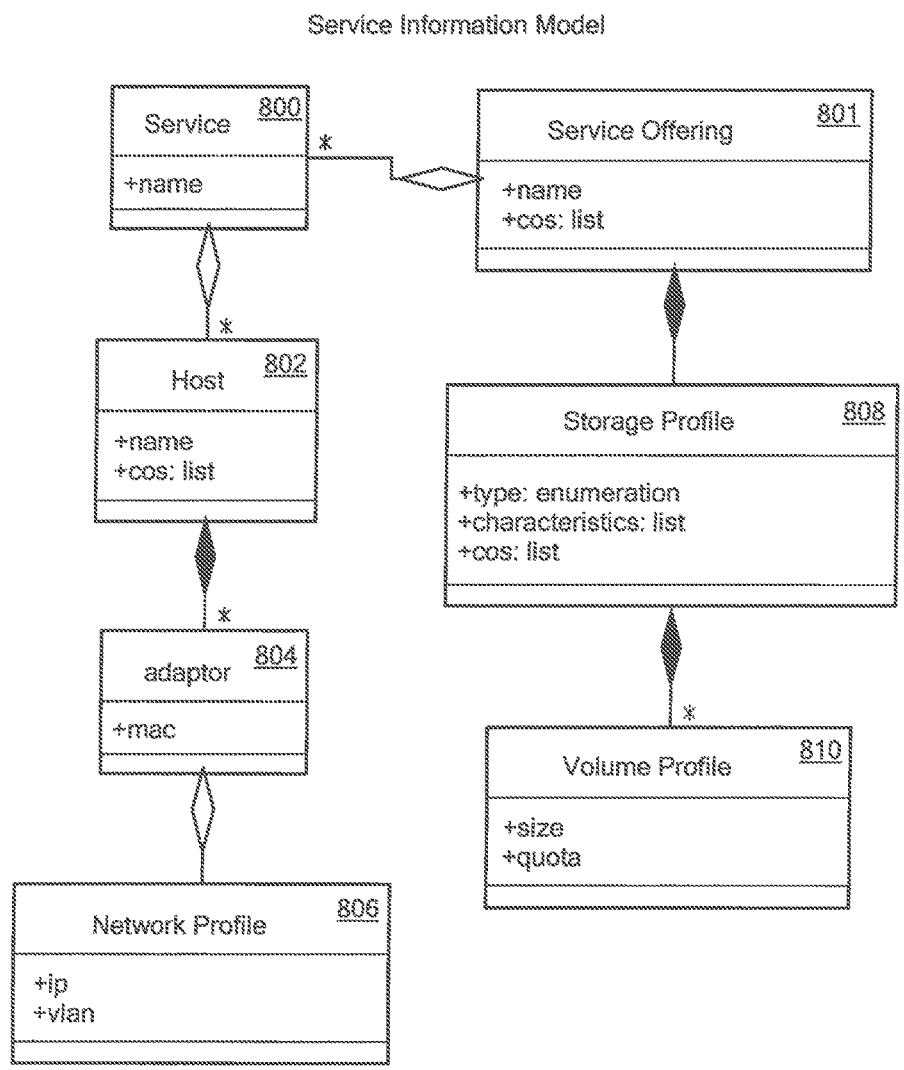
FIG. 8 is representation showing a service configuration model.
Figure 8A:
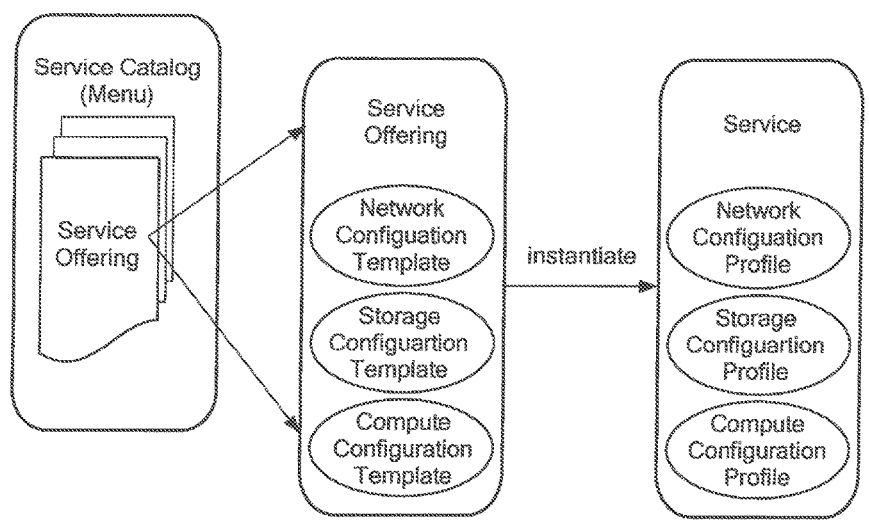
FIG. 8A is representation of a service catalog menu and service offerings.

FIG. 8 shows a model of the service and offering information stored within the management layer of the components in FIG. 7. A service 800 is a representation of a desired service as described by a service offering 801. An exemplary relationship is shown in FIG. 8A where the service properties as described in the offering are used to describe the characteristics and properties of the service to be created. A service catalog has a menu of service offerings, each having network configuration settings, service configuration settings, and compute configuration settings.

Referring again to FIG. 8, one or more hosts 802 are associated with a service to fulfill the compute requirements of the service. One or more network adaptors 804 are associated with a service to indicate the need for Ethernet connectivity to a network. A network profile 806 is associated with each adaptor 804 that indicates the VLAN and IP address required to fulfill the storage connectivity using the Ethernet. This network profile 806 is associated to a storage profile 808 to indicate that the host is to obtain storage from a network with this VLAN and IP network.

The service offering 801 is used to hold the relationships and detailed description for the user to choose the offering from a menu of offerings. The storage profile 808 is associated with the offering 801 to indicate the class of storage and service settings for the storage to be configured such as features like de-duplication, write once read many, auto-extension, maximum auto-extensions, thin provisioning, etc. A volume profile 810 is associated with the storage profile 808 to indicate specific volume properties and characteristics such as size and quota limitations.

Figure 9:
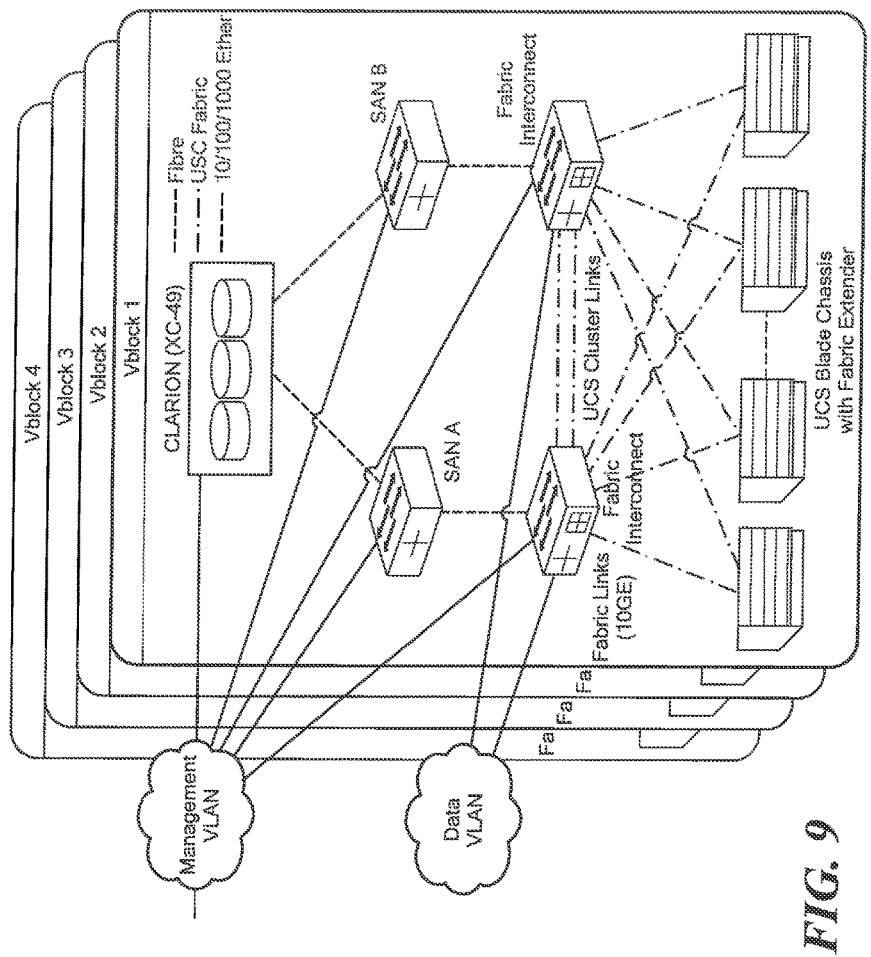
FIG. 9 is a schematic representation showing pods in a cloud environment.
Figure 10:
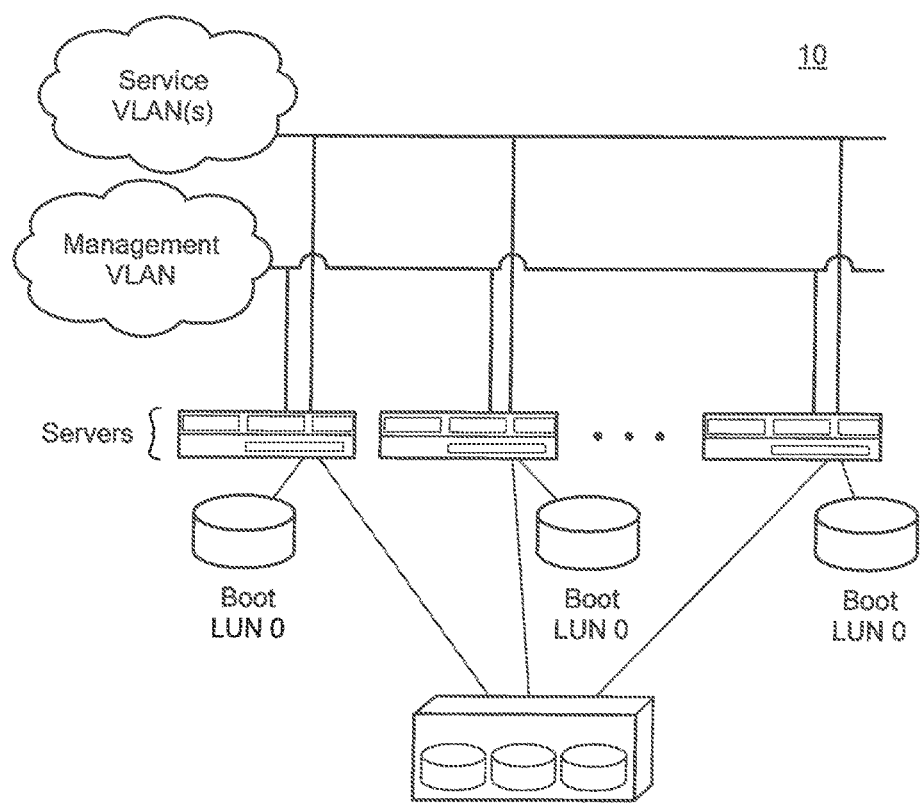
FIG. 10 is a schematic representation of service and management VLANs, servers, and storage.

FIG. 9 shows a series of "PODs" used to create cloud infrastructures, where each Vblock is considered its own POD. FIG. 10 shows a set of servers in a POD arranged in a cluster with shared storage.

Figure 11:
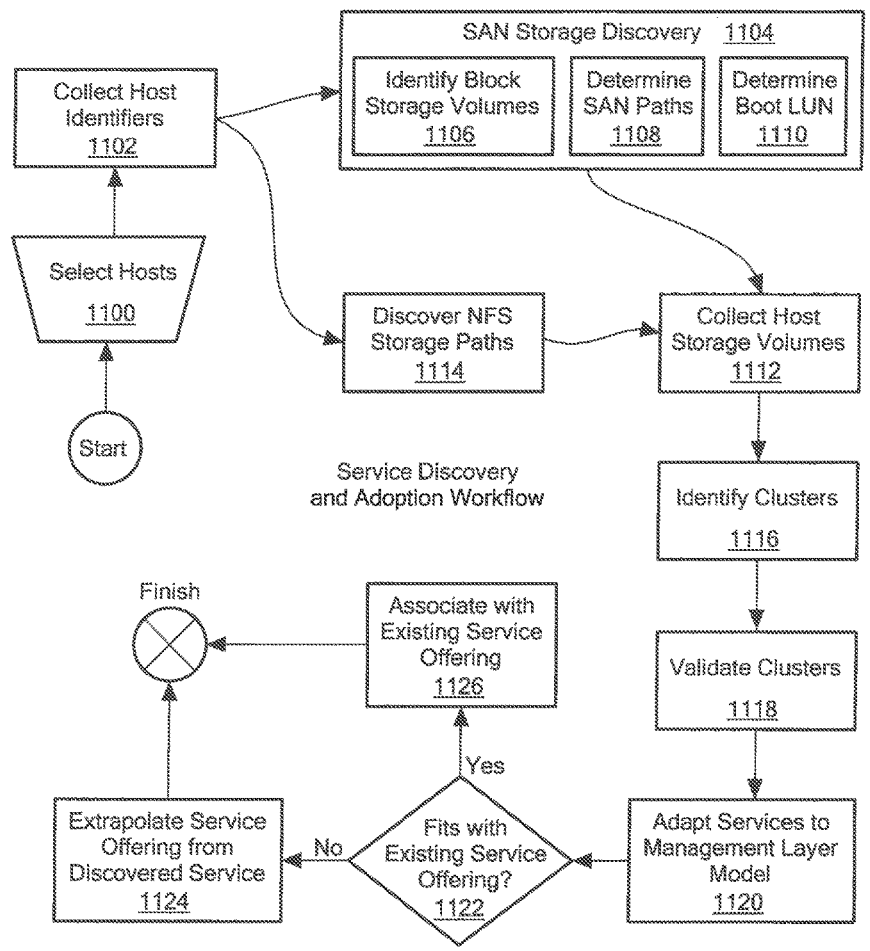
FIG. 11 is a flow diagram showing a flow of events during adoption of an infrastructure service.

FIG. 11 shows an exemplary sequence of steps taken during the discovery and adoption of a service into the management layer of a cloud environment. In step 1100, hosts are selected from which a service may be derived. In step 1102, the unique identifiers (WWPNs and IP Addresses) are collected from each host.

Processing then splits into discovery of block storage in the SAN fabrics 1104 and file storage paths in the NFS environment 1114. The SAN discovery 1104 includes identifying block storage volumes 1106, discovering the existing zoning/SAN paths 1108, and determining the boot volume 1110. After SAN and NFS storage 1104, 1114 has been discovered, the visible storage volumes are collected for each host in step 1112.

Based on the presence of storage volumes (block and/or file) shared across hosts, one or more clusters of hosts can be identified in the cloud environment in step 1116. In step 1118, the cluster is validated to meet the management layer's requirements, e.g., size, storage type QoS, etc., for a manageable service to be adapted into the management layer's model in step 1120. In step 1122, it is determined whether or not the service can be associated with a service offering that already exists in the management layer. If not, in step 1124 a service offering can be extrapolated from the structure of the discovered service and provided to a user. If so, in step 1126, the cluster is associated with existing service offerings.

Figure 12A:
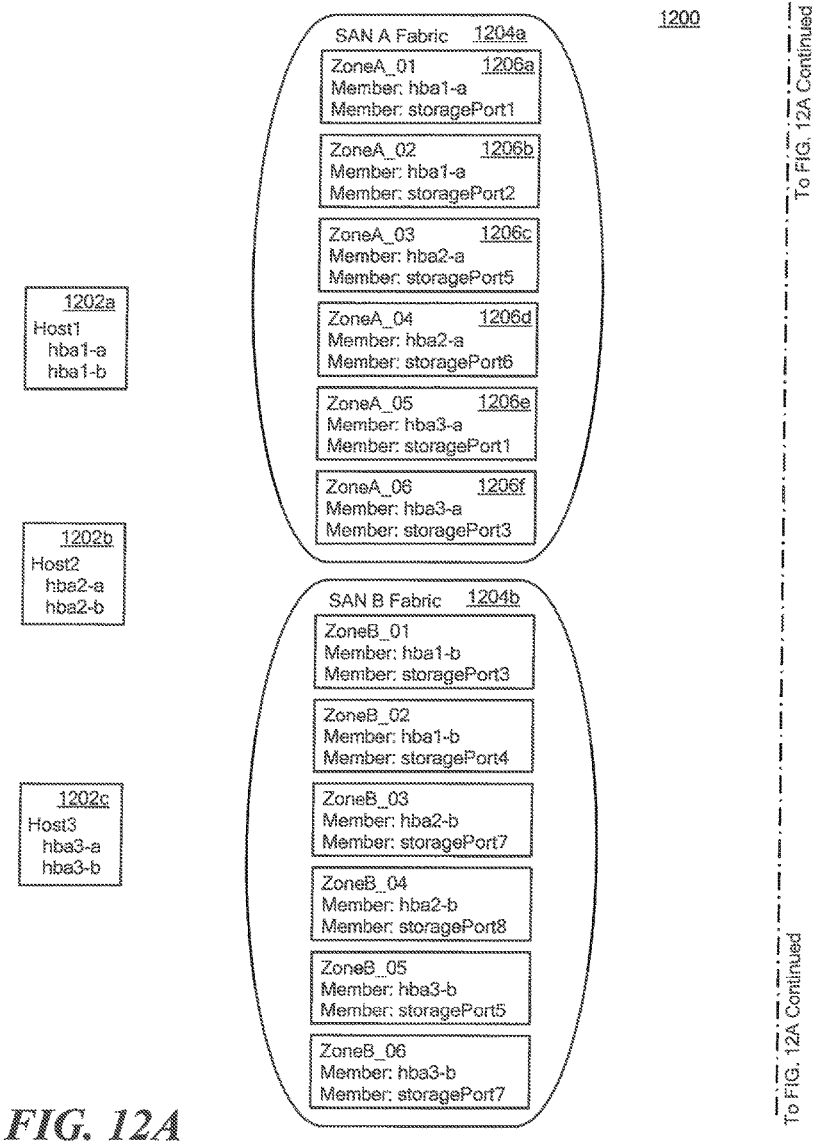
FIG. 12A is a representation of a cloud environment without SAN paths identified.
Figure 12A:
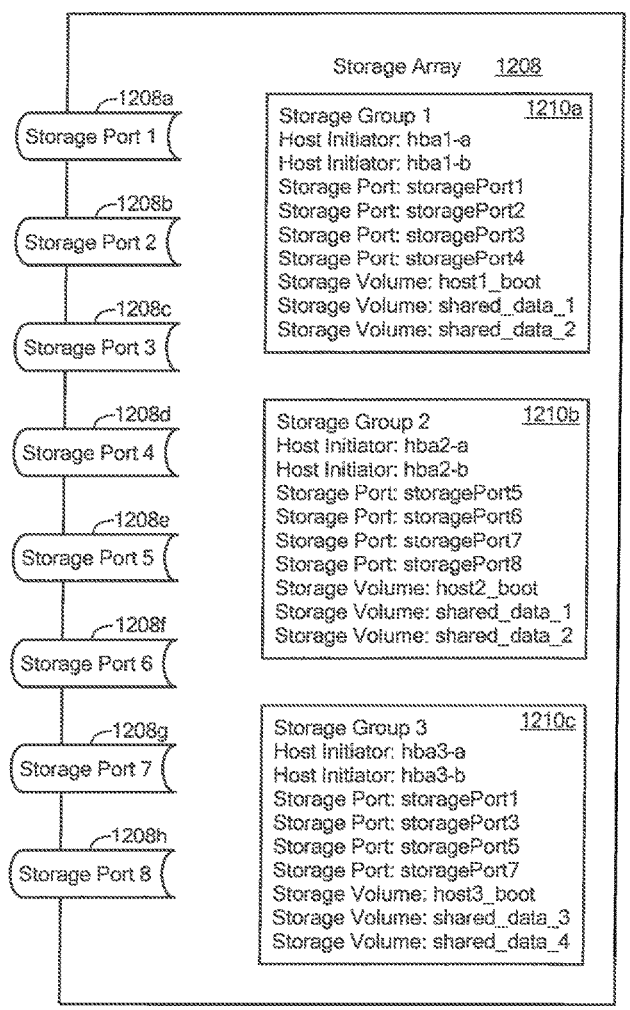

FIG. 12A shows the layout of an exemplary cloud environment 1200 for an existing cluster with shared data, before SAN paths have been discovered in the environment. On the left side, hosts 1202a,b,c are shown that are available for discovery, each containing first and second HBAs with one intended to connect into each SAN fabric. For example, the first host 1202a includes a first HBA hba1-a and a second HBA hba1-b. The second host includes hba2-a and hba2-b, and so on.

In the middle of the page is shown existing zoning in first and second fabrics 1204a,b. In the illustrated embodiment, the first fabric 1204a has six zones 1206a-f. Standard practice for SAN zoning is to have two zones existing per HBA in each fabric, for a total of four possible paths between host and storage array. On the right side of the page is shown the storage array configuration 1208. The array has eight storage ports 1210a-h and a number of storage groups 1210a-c containing host bus adapters, storage ports, a boot storage volume, and some shared storage volumes, as shown.

Figure 12B:
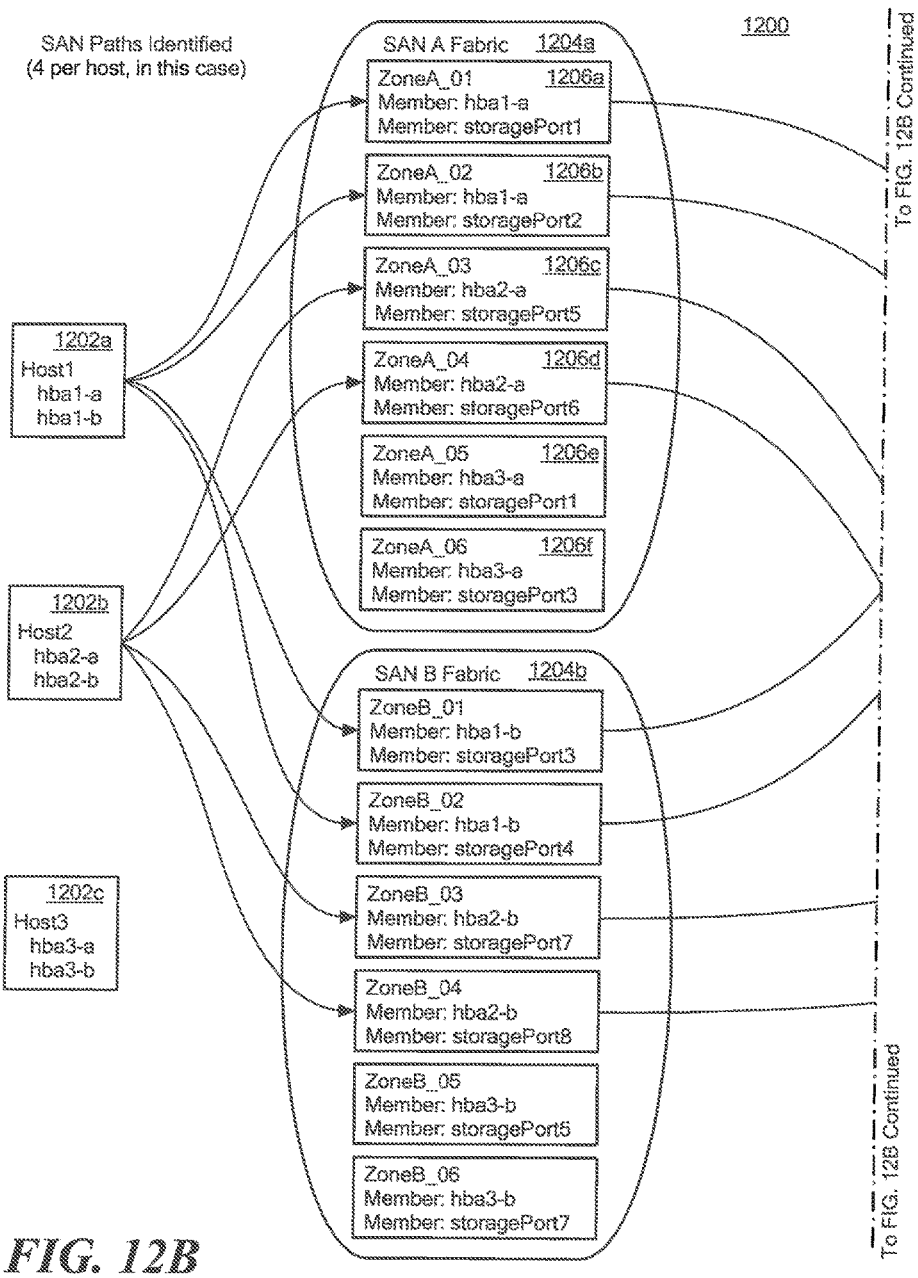
FIG. 12B is a representation of an exemplary service having SAN paths discovered in a cloud environment.
Figure 12B:
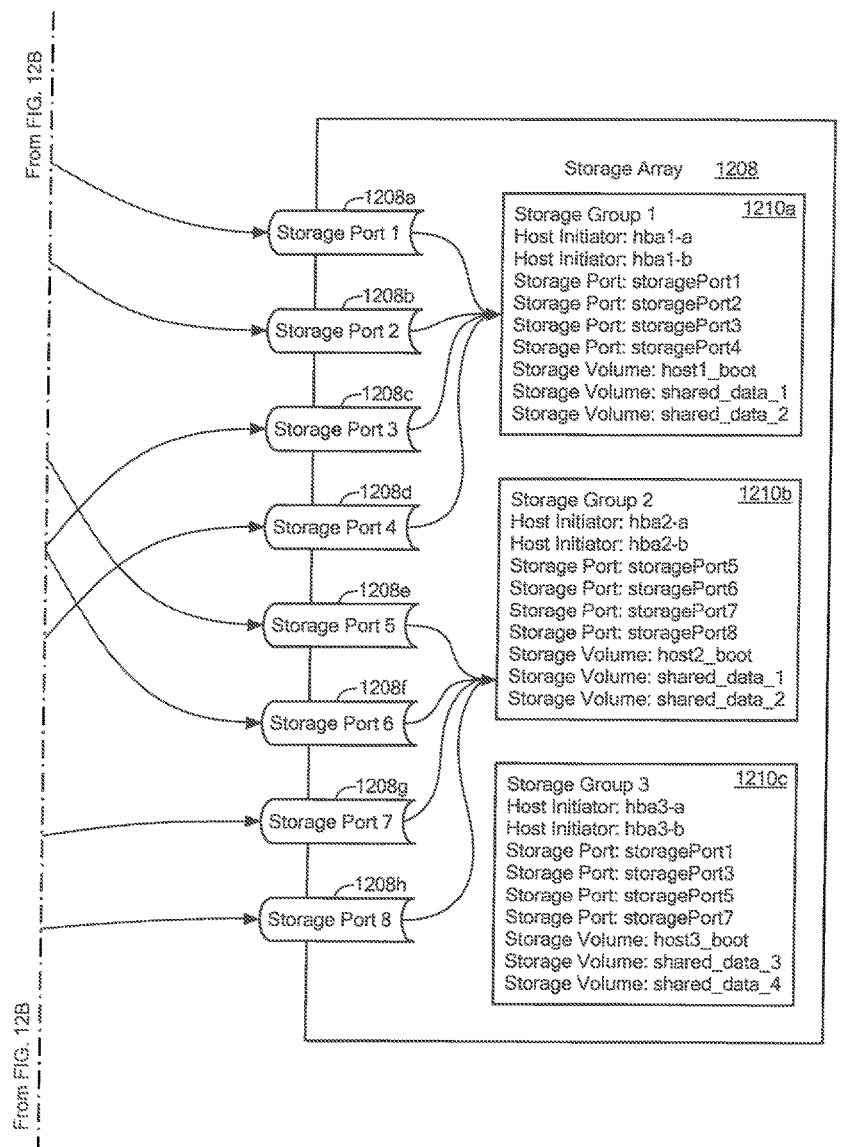

FIG. 12B shows an exemplary cluster after SAN paths have been discovered. In an exemplary embodiment, the process starts with the host bus adapters in the hosts. Next, the system finds storage groups in the storage array containing the host bus adapters. The system then takes the storage ports from the found storage group and finds zones in the fabrics that contain both the host bus adapter and one (or more) of the storage ports. At that point, a valid SAN path has been found. This process should be repeated until all SAN paths have been found.

In another aspect of the invention, a cloud environment provides array agnostic fully automated storage tiering (FAST) support for managed service storage across different array platforms. In general, while having some high level similarities, different storage array types provide varying mechanisms and models to support FAST, thereby making the FAST setup and provisioning experience tedious and difficult to manage in conventional systems. Exemplary embodiments of the invention provide a standardized and normalized user experience on various storage array types and allow managed services to consume storage from FAST associated LUNs, regardless of the underlying array or array mechanisms, thereby abstracting away the complexities.

It is known that conventional datacenters are typically populated with systems of many types, from various vendors, which often have different methods and processes to achieve the same functionality. For example, most storage systems implement a method of expanding a storage volume, but each vendor has their own differently branded-name for the feature, with procedures that are different enough so as to require datacenter technicians to know the different procedures for each one. And sometimes a vendor will have more than one model of storage system, each with varying implementations of the same feature, so that using a single vendor does not overcome this issue.

Currently available storage array often have what is referred to as "automated storage tiering." The way in which this feature is implemented on different arrays varies, while producing similar results. The internal model used to represent the array entities varies, as do the commands used to configure the feature. So, one array may have tiering 'policies' that contain 'tiers' each of which includes a collection of multiple storage pools, while another may have multiple tiers within a single pool. Such fundamental differences in the way the array represents and implements this feature end up requiring larger IT staff, more training, and more chances to confuse arrays and mis-configure a system.

In exemplary embodiments of the invention, the above automated storage tiering issued are addressed by hiding the internals of the implementation and giving users a single, consistent interface for configuring automated storage tiering on storage when provisioning storage resources to services in their datacenter.

Fully Automated Storage Tiering (FAST), which can be provided for virtual pools (VP), for example, increases performance by intelligently managing data placement at a sub-LUN level. When FAST is implemented, the storage system measures, analyzes, and implements a dynamic storage-tiering policy much faster and more efficiently than an administrator could ever achieve.

Storage tiering puts drives of varying performance levels and cost into a storage pool. LUNs use the storage capacity they need from the pool, on the devices with the required performance characteristics. The relative activity level of each slice is used to determine which slices should be promoted to higher tiers of storage. Relocation is initiated at the user's discretion through either manual initiation or an automated scheduler.

As data progresses through its life cycle, it experiences varying levels of activity. When data is created, it is typically heavily used. As it ages, it is accessed less often. This is often referred to as being temporal in nature.

In an exemplary embodiment, a FAST system segregates disk drives into the following tiers:
  extreme performance tier—e.g., flash drives;
  performance tier—e.g., serial attach SCSI (SAS) drives and Fibre Channel (FC) drives; and
  capacity Tier—e.g., Near-Line SAS (NL-SAS) drives and SATA drives Flash drives are built on solid-state drive (SSD) technology with no moving parts. The absence of moving parts makes these drives highly energy-efficient, and eliminates rotational latencies.

Therefore, migrating data from spinning disks to Flash drives can boost performance and create significant energy savings. Adding a small (e.g., single-digit) percentage of Flash capacity to storage, while using intelligent tiering can deliver double-digit percentage gains in throughput and response time performance in some applications.

Traditional spinning drives offer high levels of performance, reliability, and capacity. These drives are based on mechanical hard-drive technology that stores digital data on a series of rapidly rotating magnetic platters, e.g., 10 k and 15 k rpm spinning drives.

Using capacity drives can significantly reduce energy use and free up more expensive, higher-performance capacity in higher storage tiers. In some environments, 60 percent to 80 percent of the capacity of many applications has little I/O activity. Capacity drives can cost about four times less than performance drives on a per-gigabyte basis, and a small fraction of the cost of Flash drives. They consume up to 96 percent less power per TB than performance drives. Capacity drives have a slower rotational speed than Performance Tier drives, e.g., 7.2 k rotational speed.

In general, FAST systems operate by periodically relocating the most active data up to the highest available tier to ensure sufficient space in the higher tiers FAST relocates less active data to lower tiers. In an exemplary embodiment, each 1 GB block of data is referred to as a "slice." When FAST relocates data, it will move the entire slice to a different storage tier.

Heterogeneous storage pools are the framework that allows FAST to fully utilize each of the storage tiers discussed. Heterogeneous pools are made up of more than one type of drive. LUNs can then be created at the pool level. These pool LUNs are not bound to a single storage tier; instead, they can be spread across different storage tiers within the same pool.

Figure 13:
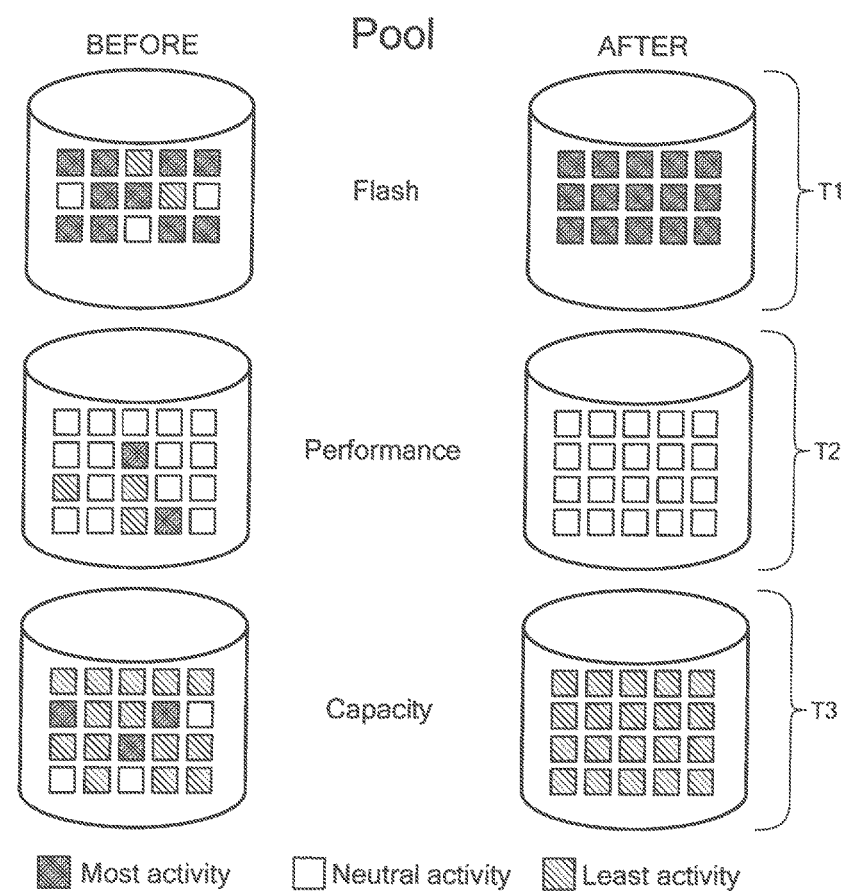
FIG. 13 is a schematic of automated storage tiering.

FIG. 13 shows exemplary before and after data location by tier T1, T2, T3. As can be seen, before data relocation by tier, most active, neutral active and least active data are spread throughout the first T1, second T2, and third tiers T3. After data relocation, the most active data is relocated to storage in the highest performance tier T1.

In an exemplary embodiment, LUNs must reside in a pool to be eligible for FAST relocation. Pools support thick LUNs and thin lUNs. Thick LUNs are high-performing LUNs that use contiguous logical block addressing on the physical capacity assigned from the pool. Thin LUNs use a capacity-on-demand model for allocating drive capacity. Thin LUN capacity usage is tracked at a finer granularity than thick LUNs to maximize capacity optimizations. FAST is supported on both thick LUNs and thin LUNs.

In general, FAST systems uses a series of strategies to identify and move the correct slices to the desired tiers: statistics collection, analysis, and relocation.

In one aspect of statistics collection, a slice of data is considered hotter (more activity) or colder (less activity) than another slice of data based on the relative activity level of the two slices. Activity level is determined by counting the number of I/Os for each slice. FAST maintains a cumulative I/O count and "weights" each I/O by how recently it arrived. This weighting decays over time. New I/O is given full weight. After approximately 24 hours, for example, the same I/O carries about half-weight. After a week. the same I/O carries little weight. Statistics are continuously collected (as a background task) for all pool LUNs.

As part of the analysis process, once per hour, for example, the collected data is analyzed to produce a rank ordering of each slice within the pool. The ranking progresses from the hottest slices to the coldest slices relative to the other slices in the same pool. (For this reason, a hot slice in one pool may be comparable to a cold slice in another pool.) There is no system-level threshold for activity level. The most recent analysis before a relocation determines where slices are relocated.

During user-defined relocation windows, 1 GB slices are promoted according to both the rank ordering performed in the analysis stage and a tiering policy set by the user. During relocation, FAST relocates higher-priority slices to higher tiers; slices are relocated to lower tiers only if the space they occupy is required for a higher-priority slice. This way, FAST fully utilizes the highest-performing spindles first. Lower-tier spindles are utilized as capacity demand grows. Relocation can be initiated manually or by a user-configurable, automated scheduler.

The relocation process targets to create ten percent free capacity, for example, in the highest tiers in the pool. Free capacity in these tiers is used for new slice allocations of high priority LUNs between relocations.

FAST properties can be viewed and managed at the pool level. FIG. 14 shows the tiering information T1, T2, T3 for a specific pool. The tier status section 1400 of the window shows FAST relocation information specific to the pool selected. Scheduled relocation can be selected at the pool level from the drop-down menu labeled Auto-Tiering 1402. This can be set to either Scheduled or Manual. Users can also connect to the array-wide relocation schedule. Data Relocation Status 1404 displays what state the pool is in with regards to FAST. The ready state indicates that relocation can begin on this pool at any time. The amount of data bound 1406 for a lower tier is shown next to Data to Move Down 1406 and the amount of data bound for a higher tier is listed next to Data to Move Up 1408. Below that is the estimated time 1410 required to migrate all data within the pool to the appropriate tier.

In an exemplary embodiment, there are four tiering policies available within FAST:

Auto-tier
Highest available tier
Lowest available tier
No data movement

In one embodiment, auto-tier is the default setting for pool LUNs upon their creation. FAST relocates slices of these LUNs based on their activity level. Slices belonging to LUNs with the auto-tier policy have second priority for capacity in the highest tier in the pool after LUNs set to the highest tier.

The highest available tier setting should be selected for those LUNs which, although not always the most active, require high levels of performance whenever they are accessed. FAST will prioritize slices of a LUN with highest available tier selected above all other settings. Slices of LUNs set to highest tier are rank ordered with each other according to activity. Therefore, in cases where the sum total of LUN capacity set to highest tier is greater than the capacity of the pool's highest tier, the busiest slices occupy that capacity.

The lowest available tier should be selected for LUNs that are not performance or response-time-sensitive. FAST maintains slices of these LUNs on the lowest storage tier available regardless of activity level.

No data movement may only be selected after a LUN has been created. FAST will not move slices from their current positions once the no data movements election has been made. Statistics are still collected on these slices for use if and when the tiering policy is changed.

The tiering policy chosen also affects the initial placement of a LUN's slices within the available tiers. Initial placement with the pool set to auto-tier will result in the data being distributed across all storage tiers available within the pool. The distribution is based on available capacity in the pool. If, for example, 70 percent of a pool's free capacity resides in the lowest tier, then 70 percent of the new slices will be placed in that tier.

LUNs set to highest available tier will have their component slices placed on the highest tier that has capacity available. LUNs set to lowest available tier will have their component slices placed on the lowest tier that has capacity available.

LUNs with the tiering policy set to no data movement will use the initial placement policy of the setting preceding the change to no data movement. For example, a LUN that was previously set to highest tier but is currently set to no data movement will still take its initial allocations from the highest tier possible.

When a pool includes LUNs with stringent response time demands, users may set all LUNs in the pool to highest available tier. That way, new LUN slices are allocated from the highest tier. Since new data is often the most heavily used, this provides the best performance for those slices. At the same time, if all LUNs in the pool are set to highest tier, slices are relocated based on their relative activity to one another.

The highest available tier policy can be used for large scale migrations into a pool. When the migration process is started, it is best to fill the highest tiers of the pool first. Using the auto-tier setting would place some data in the capacity tier. At this point, FAST has not yet run an analysis on the new data so it cannot distinguish between hot and cold data. Therefore, with the auto-tier setting, some of the busiest data may be placed in the capacity tier. In these cases, the target pool LUNs can be set to highest tier. That way, all data is initially allocated to the highest tiers in the pool. As the higher tiers fill and capacity from the capacity (NL-SAS) tier starts to be allocated, the migration can be stopped to run a manual relocation. Assuming an analysis has had sufficient time to run, relocation will rank order the slices and move data appropriately. In addition, since the relocation will attempt to free ten percent of the highest tiers, there is more capacity for new slice allocations in those tiers.

Figure 15:
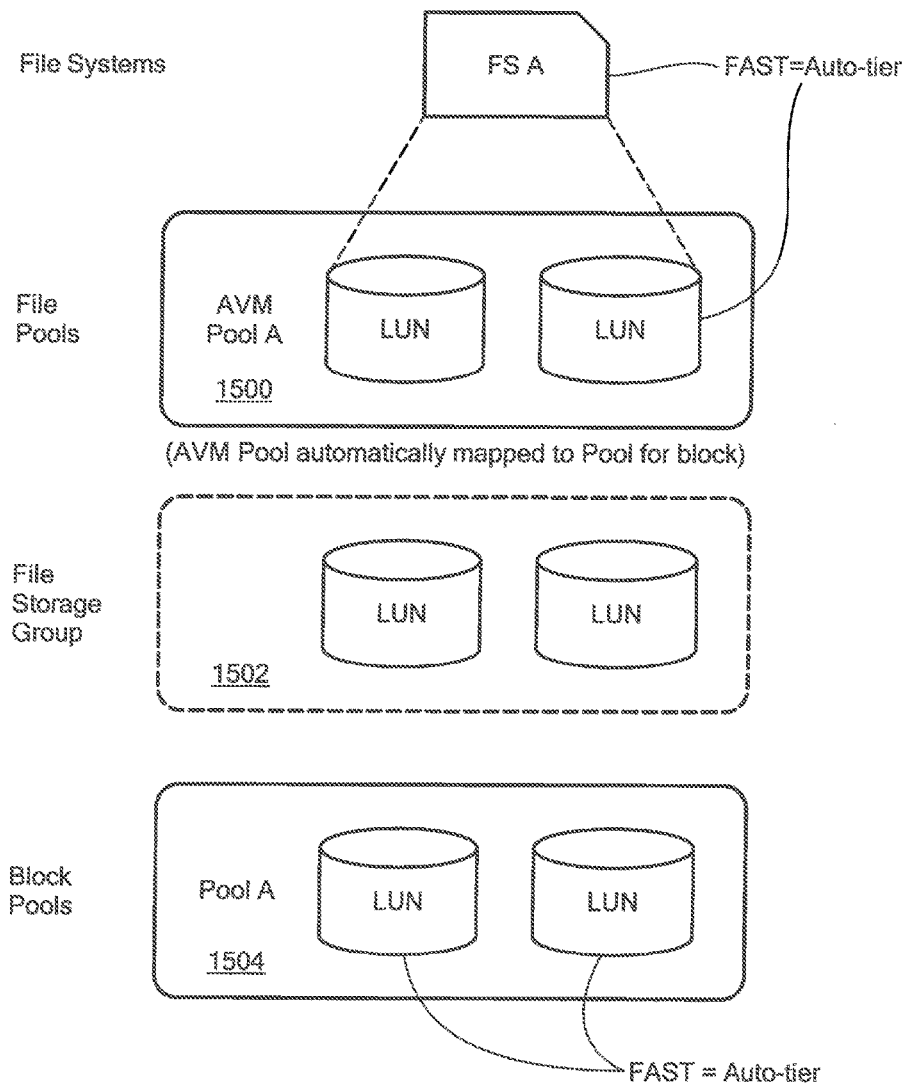
FIG. 15 is a schematic representation of storage pools.

FIG. 15 shows an exemplary FAST representation for files. An exemplary process begins by provisioning LUNs from a pool 1500 with mixed tiers (or across pools) that are placed in the protected file storage group 1502. Rescanning the storage systems starts a diskmark that makes the LUNs available to file storage. The rescan automatically creates a pool for file using the same name as the corresponding pool for block 1504. Additionally it will create a disk volume in a 1:1 mapping for each LUN that was added to the file storage group. A file system can then be created from the pool for file on the disk volumes. The FAST policy that has been applied to the LUNs presented to file will operate as it does for any other LUN in the system, dynamically migrating data between storage tiers in the pool.

In one aspect of the invention, an array agnostic FAST support mechanism is provided for applying FAST policies to managed service storage in array agnostic manner. The FAST policies cover storage having a variety of types. The storage detail is abstracted for the user to enable the user to select a policy without needing to understand the underlying mechanisms and models of the storage types. The user can rely on managed services to consume storage from FAST associated LUNs, regardless of the underlying array or array mechanisms.

Figure 16:
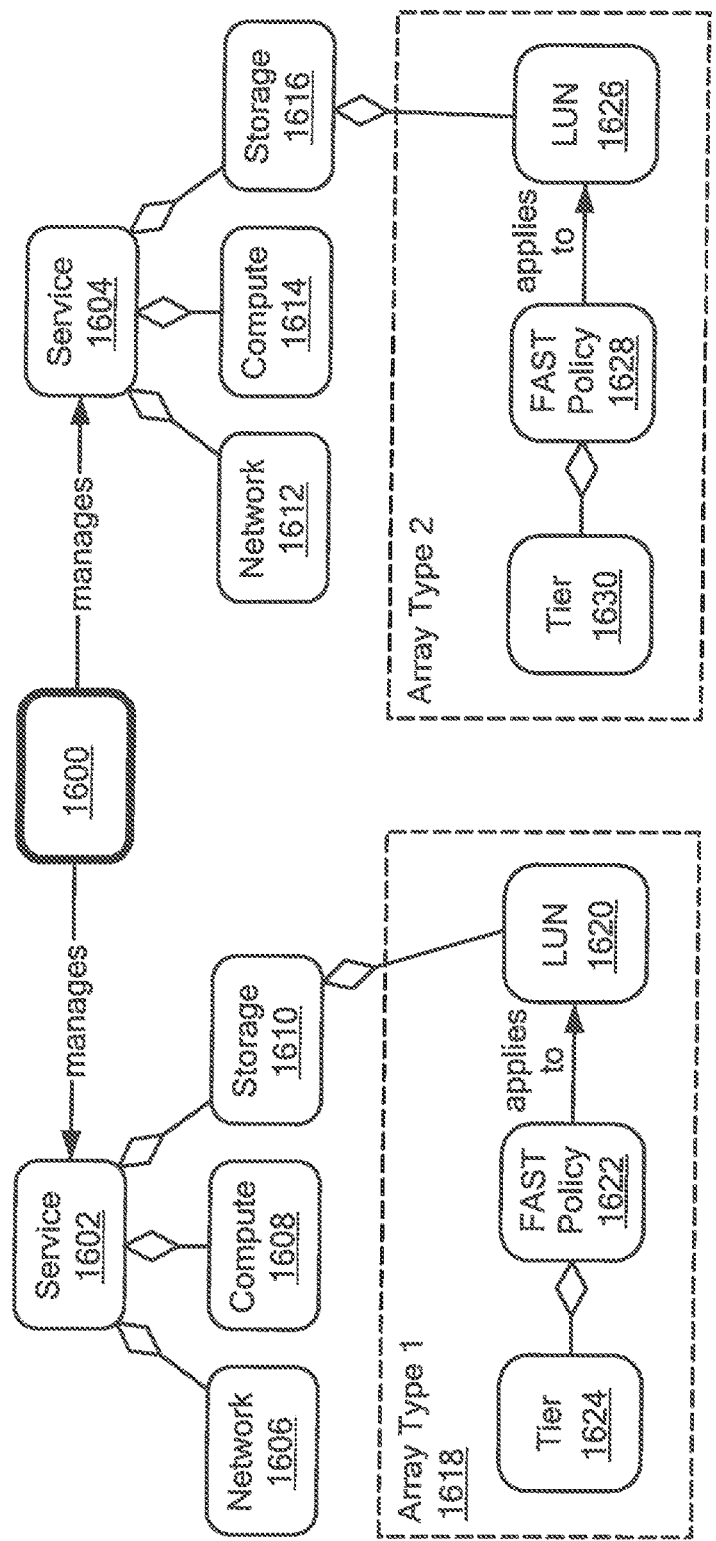
FIG. 16 is a schematic representation of a management module to provide array agnostic automated storage tiering.

FIG. 16 shows an exemplary system having a management module 1600 managing first and second services 1602,

1604. The first service includes network resources 1606, compute resources 1608, and storage resources 1610. Similarly, the second service 1604 includes respective network, compute, and storage resources 1612, 1614, 1616.

The storage resource 1610 of the first service 1602 includes a first array type 1618 having a LUN 1620 as part of the storage resource 1610. The LUN 1620, which can have any suitable characteristics, has a FAST policy 1622 including an assigned tier 1624. Similarly, the second storage resource 1616 includes a LUN 1626, having a FAST policy 1628 and tier 1630.

As described above, the system environment, allows users to deploy services on converged infrastructure systems to enable IaaS (Infrastructure as a Service). Using the management module 1600, users deploy services, e.g., first service 1602, comprising compute, network and storage resources 1606, 1608, 1610, into datacenters in an automated fashion. The management module 1600 removes the burden of manually configuring the underlying components (i.e.: servers, switches, storage arrays, etc.).

The characteristics of the required storage resources should be described while leveraging the internal capabilities of the existing storage system configuration. Users describe what kind of storage is required without specific expertise on the various available storage array.

Figure 17:
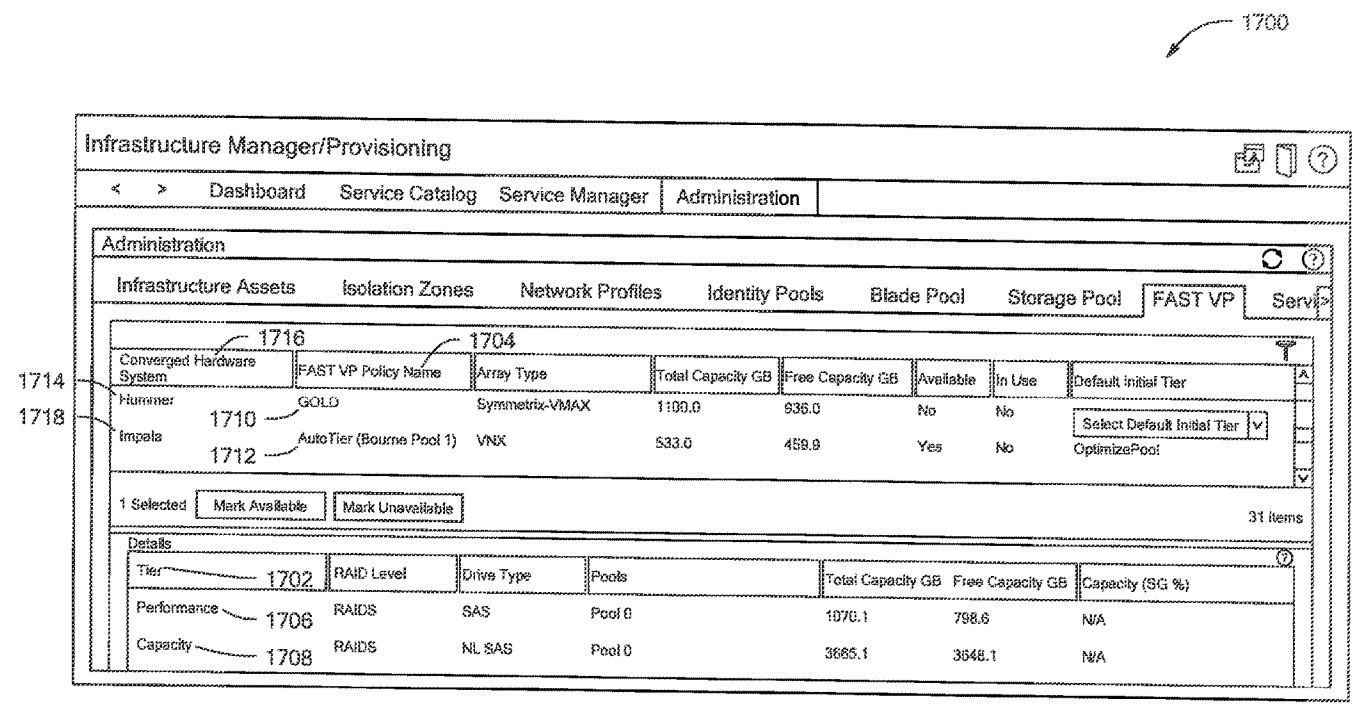

As shown in the display 1700 of FIG. 17, one characteristic of the storage volume to be provisioned is the tiering policy 1702. In one embodiment, a set of pre-existing policies 1704 and/or tiers, shown as performance 1706 and capacity (see above), is defined on the array from which the user can select. The user may know what policy name to select or can examine the names of the policies and select one based on the name. Illustrative policy names include gold 1710, auto-tier 1712 silver (not shown), 'high-speed-production,' 'low-speed-archive,' etc.

In the illustrated display 1700, the gold 1710 FAST policy is associated with a converged hardware system 1716 named hummer 1714. The auto-tier policy 1712 is associated with Imapal 1718. The systems named hummer 1714 and imapal 1718 are of disparate array types "VMAX" and "VNX," which have different underlying implementations of storage tiering.

Figure 18:
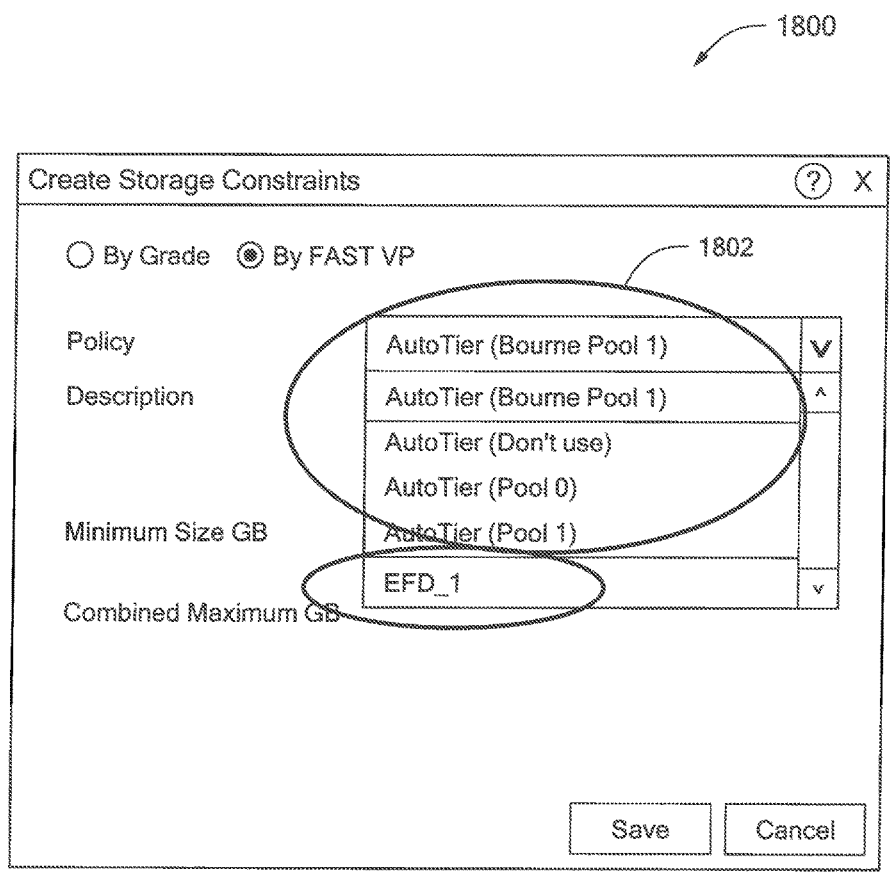
FIG. 18 shows an exemplary display to enable a user to see storage contraints.

FIG. 18 shows an exemplary display 1800 that enables a user to create storage constraints for a service by selecting from a drop down menu of tiering policies 1802 to be applied to storage. The drop down list 1802 contains policies from disparate array types. The user need not know which policies apply to which arrays. Once selected, the system uses the selected policy on the array, using the array-specific commands and procedures, leaving the user unaware of the details.

It is understood that the term FAST is not limited to any particular vendor or automated storage tiering, but rather, any practical automated storage tiering systems and techniques.

Figure 19C:
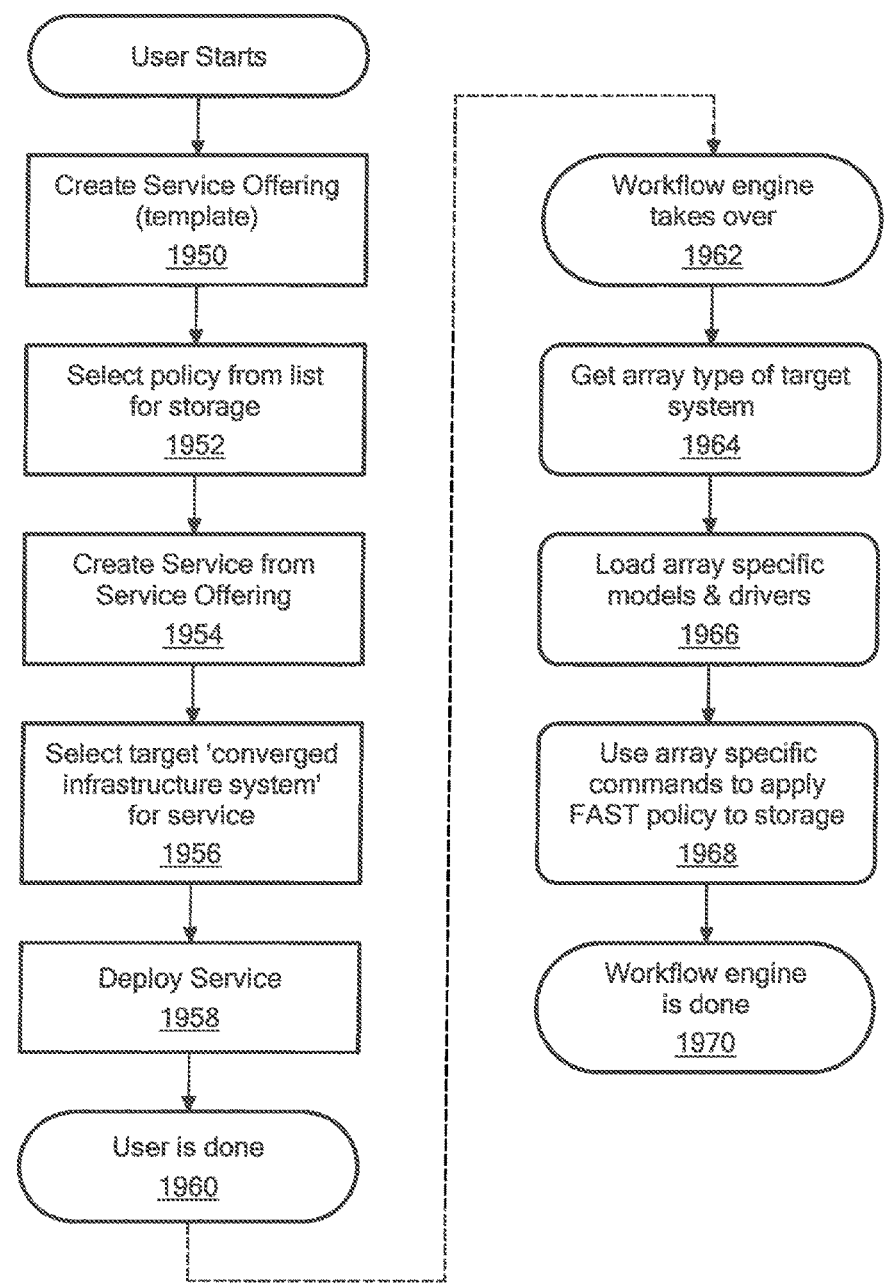
FIG. 19A is a flow diagram showing an exemplary sequence of steps to create a service with a tiering policy applied to storage.
FIG. 19B is a flow diagram showing an exemplary sequence of steps to modify a service to apply a tiering policy to storage.
FIG. 19 C is a flow diagram showing array agnostic automated storage tiering policy selection.

FIG. 19A shows an exemplary sequence of steps for creating a service from a service offering template. In step 1900, a service offering template is created. In step 1902, storage constraints are added to the template. In step 1904, a tiering policy is selected to apply to the storage. In step 1906, a service is created from the service offering template.

FIG. 19B shows an exemplary sequence of steps for editing a tiering policy for an existing service. In step 1910, a user can edit an existing service to add storage to the service in step 1912. In step 1914, a tiering policy is applied to the storage. In step 1916, the changes made to the service are applied.

FIG. 19 C shows an exemplary sequence of steps for providing array agnostic automated storage tiering. In step 1950, a service offering template is created. A user describes how the storage should be configured for a service by creating a template known as a 'service offering.' The template includes a place to assign a FAST policy to the storage from a list provided as a drop down menu in step 1952. In step 1954, the user then uses that service offering template to create an actual service that will have the configuration specifications defined in the service offering template. In the creation of the service, in step 1956 the user selects a converged hardware system on which to run the service that contains compute and network resources as well as a storage array of unknown type to the user. In step 1958, the service is deployed and the user is done in step 1960 so that an automated workflow engine takes over in step 1962. The engine finds the array type for the storage in the service in step 1964 and loads the appropriate model and drivers in step 1966 that represents the way that specific array implements FAST. In step 1968, the engine then loads the drivers with the appropriate commands for that array type. Once the drivers have completed the workflow engine finishes in step 1970.

Figure 20:
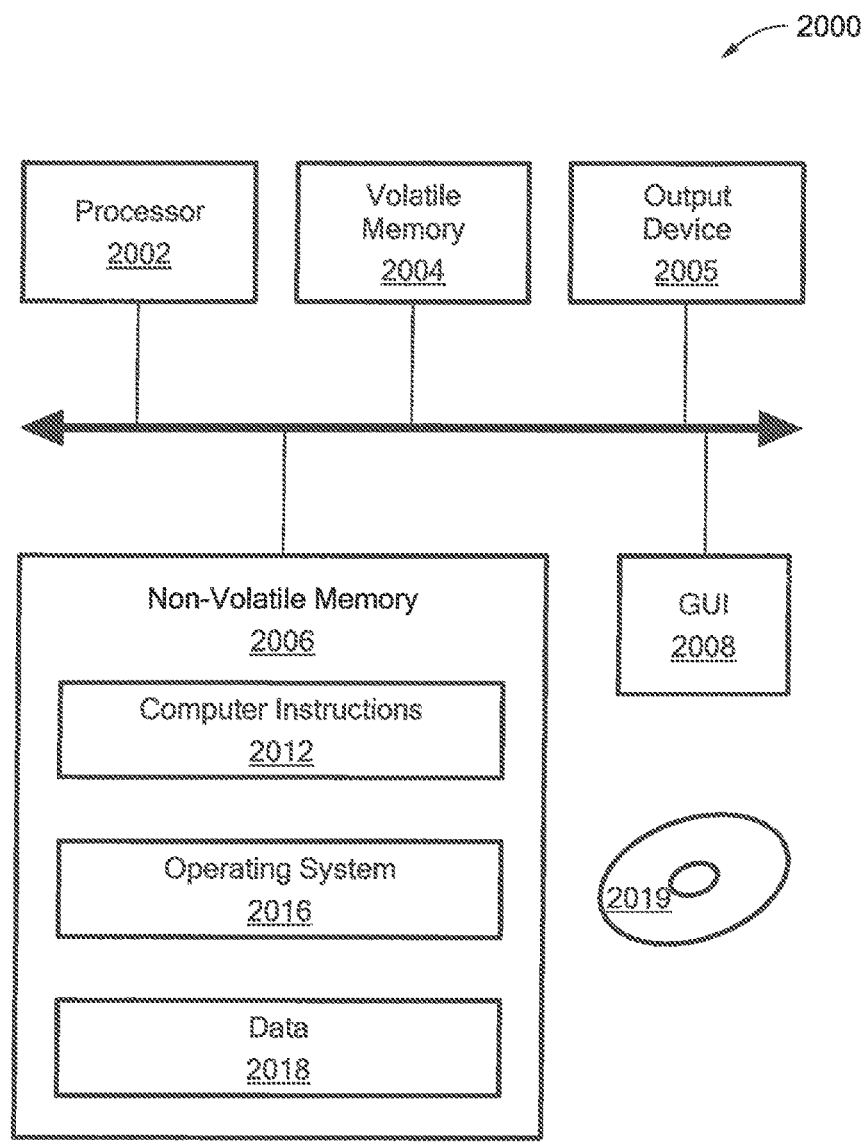
FIG. 20 is a schematic representation of an exemplary computer that can perform at least part of the processing described herein.

FIG. 20 shows an exemplary computer that can perform at least a part of the processing described herein. A computer includes a processor 2002, a volatile memory 2004, an output device 2005, a non-volatile memory 2006 (e.g., hard disk), and a graphical user interface (GUI) 2008 (e.g., a mouse, a keyboard, a display, for example). The non-volatile memory 2006 stores computer instructions 2012, an operating system 2016 and data 2018, for example. In one example, the computer instructions 2012 are executed by the processor 2002 out of volatile memory 2004 to perform all or part of the processing described above. An article 2019 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
using a computer processor to display information for user fields, the user fields comprising first one or more user fields relating to choosing a desired converged hardware system from a plurality of converged hardware systems and comprising second one or more user fields related to choosing a desired automated storage tiering policy from a plurality of available automated storage tiering policies to be used with the plurality of converged hardware systems,
the automated storage tiering policies controlling location of data to be stored in a storage array based on relative activity level of the data, wherein the plurality of converged hardware systems each comprise at least one or more respective storage arrays, each respective storage array associated with a respective set of array characteristics;
configuring, the user fields to abstract, from a user, details concerning the respective set of array characteristics and details concerning whether, based on the respective set of array characteristics, any of the available automated storage tiering policies are usable with a given storage array of a given converged hardware system; wherein:
the respective set of array characteristics comprise at least one or more characteristics selected from the group consisting of: a storage type, a vendor, a location, a switch type, a server type, a drive type, a redundant array of independent disk (RAID) level, a capacity, a speed, a cost, a reliability, an availability, a performance level, a pool, a volume property, a quota, a tiering policy, and a memory technology type;
the plurality of converged hardware systems comprise at least a first converged hardware system having a first storage array with a first respective set of array characteristics and a second converged hardware system having a second storage array with a second respective set of array characteristics,
wherein the first set of array characteristics and the second set of array characteristics are different; and
the displayed user fields for selecting the desired storage tiering policy and for selecting the desired converged hardware system are configured to permit a first user selection of the desired storage tiering policy and a second user selection of the desired converged hardware system to which the desired storage tiering policy is to be applied, wherein the user fields are configured to accept user selections independent of whether or not the selected desired automated storage tiering policy is applicable to the respective storage array associated with the selected desired converged hardware system;
receiving, from the user, the first user selection for the desired automated storage tiering policies for storage and the second user selection for the desired convergent hardware system to which the selected desired automated tiering policy is to be applied, wherein, responsive to the first and second user selections, the selected automated storage tiering policy is automatically configured to cover the one or more storage arrays associated with the selected desired converged hardware system;
providing a model of physical information stored within a management layer of the selected at least one converged hardware system;
providing a model of service and offering information stored within the management layer;
creating automatically, based at least in part on the first and second user selections, a first service to run on the selected at least one converged hardware system, the first service configured in accordance with the selected respective first one of the automated storage tiering policies; and
adopting the first service into the management layer, and splitting storage discovery of storage in first storage resources of the converged hardware systems into discovery of block storage in SAN fabrics and discovery of file storage paths;
wherein the automated storage tiering policies cover a plurality of storage types.

2. The method according to claim 1, wherein the displayed information for the user fields is configured so that information relating to the respective set of array characteristics is not displayed to or available to the user.

3. The method according to claim 1, wherein the automated storage tiering policies are associated with a service level.

4. The method according to claim 1, wherein the automated storage tiering policies that determine a location for data based upon the relative activity level of the data are configured to assess quantity and timing of input/output operations to the data.

5. The method according to claim 1, further including using at least one of an array specific command, an array specific model, and an array specific driver, to automatically apply the automated storage tiering policies to the storage array.

6. The method according to claim 1, further including adding further storage to the converged hardware system selected by the user and selecting a tiering policy for the further storage.

7. A method, comprising:
in a cloud infrastructure environment having a compute layer, a network layer, a storage layer, and management layer,
displaying information for user fields, the user field comprising first one or more user fields relating to choosing a desired converged hardware system from a plurality of converged hardware systems and comprising second one or more user fields related to choosing a desired automated storage tiering policy from a plurality of available automated storage tiering policies to be used with the plurality of converged hardware systems, the automated storage tiering policies controlling location of data to be stored in a storage array based on relative activity level of the data, wherein the plurality of converged hardware systems each comprise at least one or more respective storage arrays, each respective storage array associated with a respective set of array characteristics;
configuring the user fields to abstract, from a user, details concerning the respective set of array characteristics and details concerning whether, based on the respective set of array characteristics, any of the available automated storage tiering policies are usable with a given storage array of a given converged hardware system wherein:

the respective set of array characteristics comprise at least one or more characteristics selected from the group consisting of: a storage type, a vendor, a location, a switch type, a server type, a drive type, a redundant array of independent disk (RAID) level, a capacity, a speed, a cost, a reliability, an availability, a performance level, a pool, a volume property, a quota, a tiering policy, and a memory technology type;

the plurality of converged hardware systems comprise at least a first converged hardware system having a first storage array with a first respective set of array characteristics and a second converged hardware system having a second storage array with a second respective set of array characteristics, wherein the first set of array characteristics and the second set of array characteristics are different; and the displayed user fields for selecting the desired storage tiering policy and for selecting the desired converged hardware system are configured to permit a first user selection of the desired storage tiering policy and a second user selection of the desired converged hardware system to which the desired storage tiering policy is to be applied, wherein the first user fields are configured to accept first and second user selections to be made so that such first and second user selections are made independent of whether or not the selected desired automated storage tiering policy is applicable to the respective storage array associated with the selected desired converged hardware system;

receiving, from the user, the first user selection for a first one of the available automated storage tiering policies for storage and the second user selection for at least one respective convergent hardware system to which the selected first tiering policy is to be applied, wherein, responsive to the first and second user selections, the selected automated storage tiering policy is automatically configured to cover the one or more storage arrays associated with the selected desired converged hardware system;

providing, using a computer processor, a first service having first network resources, first compute resources, and first storage resources;

providing a model of physical information stored within a management layer of the selected at least one converged hardware system;

providing a model of service and offering information stored within the management layer;

creating automatically, based at least in part on the first and second user selections, a first service to run on the selected at least one converged hardware system, the first service configured in accordance with the selected respective first one of the automated storage tiering policies;

adopting the first service into the management layer;

splitting storage discovery of storage in the first storage resources into discovery of block storage in SAN fabrics and discovery of file storage paths;

providing a second service having second network resources, second compute resources, and second storage resources;

providing a management module coupled to the first and second services;

providing the first storage resources with a first LUN having a first automated storage tiering policy with a first tier associated with the first automated storage tiering policy and the first LUN; and providing the second storage resources with a second LUN having a second automated storage tiering policy with a first tier associated with the second automated storage tiering policy and the second LUN;

wherein the first and second LUNs are of different types.

8. The method according to claim 7, further including discovering the first and second automated storage policies for the first and second storage resources.

9. The method according to claim 7, wherein the displayed information for the first and second user fields is configured so that information relating to the respective set of array characteristics of and the different types of the first and second LUNs is not displayed to the user.

10. The method according to claim 7, further including creating the first service from a service offering.

11. The method according to claim 7, further including loading or using at least one of an array specific model, an array specific driver, and an array specific command, for the first LUN.

12. The method according to claim 11, further including using one or more array specific commands specific to the first LUN to apply the first automated storage tiering policy to the first LUN.

13. An article comprising:

at least one non-transitory computer readable medium having stored instructions that enable a machine to perform at least the following in a cloud infrastructure environment having a compute layer, a network layer, a storage layer, and management layer:

displaying information for user fields, the user fields comprising first one or more user fields relating to choosing a desired converged hardware system from a plurality of converged hardware systems and comprising second one or more user fields related to choosing a desired automated storage tiering policy from a plurality of available automated storage tiering policies to be used with the plurality of converged hardware systems, the automated storage tiering policies controlling location of data to be stored in a storage array based on relative activity level of the data, wherein the plurality of converged hardware systems each comprise at least one or more respective storage arrays, each respective storage array associated with a respective set of array characteristics;

configuring the user fields to abstract, from a user, details concerning the respective set of array characteristics and details concerning whether, based on the respective set of array characteristics, any of the available automated storage tiering policies are usable with a given storage array of a given converged hardware system wherein:

the respective set of array characteristics comprise at least one or more characteristics selected from the group consisting of: a storage type, a vendor, a location, a switch type, a server type, a drive type, a redundant array of independent disk (RAID) level, a capacity, a speed, a cost, a reliability, an availability, a performance level, a pool, a volume property, a quota, a tiering policy, and a memory technology type;

the plurality of converged hardware systems comprise at least a first converged hardware system having a first storage array with a first respective set of array characteristics and a second converged hardware system having a second storage array with a second respective set of array characteristics, wherein the first set of array characteristics and the second set of array characteristics are different; and the displayed user fields for selecting the desired storage tiering policy and for selecting the desired converged hardware system are configured to permit a first user selection of the desired storage tiering policy and a second user selection of the desired converged hardware system to which the desired storage tiering policy is to be applied, wherein the user fields are configured to accept user selections independent of whether or not the selected desired automated storage tiering policy is applicable to the respective storage array associated with the selected desired converged hardware system;

receiving, from the user, the first user selection for a first one of the available automated storage tiering policies for storage and the second user selection for at least one respective convergent hardware system to which the selected first automated storage tiering policy is to be applied, wherein, responsive to the first and second user selections, the selected first automated storage tiering policy is automatically configured to cover the one or more storage arrays associated with the selected desired converged hardware system;

providing, using a computer processor, a first service having first network resources, first compute resources, and first storage resources;

providing a model of physical information stored within a management layer of the selected at least one converged hardware system;

providing a model of service and offering information stored within the management layer;

creating automatically, based at least in part on the first and second user selections, a first service to run on the selected desired converged hardware system, the first service configured in accordance with the selected first automated storage tiering policy;

adopting the first service into the management layer;

splitting storage discovery of storage in the first storage resources into discovery of block storage in SAN fabrics and discovery of file storage paths;

providing a second service having second network resources, second compute resources, and second storage resources; providing a management module coupled to the first and second services;

providing the first storage resources with a first LUN having the first automated storage tiering policy with a first tier associated with the first automated storage tiering policy and the first LUN; and providing the second storage resources with a second LUN having a second automated storage tiering policy with a first tier associated with the second automated storage tiering policy and the second LUN, wherein the first and second LUNs are of different types.

14. The article according to claim 13, further including instructions for discovering the first and second automated storage policies for the first and second storage resources.

15. The article according to claim 13, wherein the displayed information for the user fields is configured so that information relating to the respective set of array characteristics of and the different types of the first and second LUNs is not displayed to the user.

16. The article according to claim 13, further including instructions for creating the first service from service offering.

17. The article according to claim 13, further including instructions for loading or using at least one of an array specific model, an array specific driver, and an array specific command for the first LUN.

18. The article according to claim 17, further including instructions for using one or more array specific commands specific to the first LUN to apply the first automated storage tiering policy to the first LUN.

19. A method operable in a cloud infrastructure environment having a compute layer, a network layer, a storage layer, and a management layer, the method comprising:

providing access to user fields, the user fields comprising first one or more user fields configured for user selection of a desired converged hardware system from a plurality converged hardware systems and second one or more user fields configured for user selection of a desired automated storage tiering policy from a plurality of available automated storage tiering policies to be used with the plurality of converged hardware systems, the plurality of automated storage tiering policies controlling location of data to be stored in a storage array based on relative activity level of the data, wherein the plurality of converged hardware systems each comprises respective compute and network resources and one or more respective storage arrays, each respective storage array having a respective predetermined type from a plurality of predetermined types and an associated respective sets of array characteristics, wherein:

each respective predetermined type of storage array is associated with a respective set of array characteristics, the respective set of array characteristics comprising at least one or more elements selected from the group consisting of: a storage type, a vendor, a location, a switch type, a server type, a drive type, a redundant array of independent disk (RAID) type, a capacity, a speed, a cost, a reliability, a performance level, a pool, a volume property, a quota, a tiering policy, and a memory technology type; and the plurality of predetermined types comprises at least first and second predetermined types associated with first and second respective sets of characteristics, wherein the first set of characteristics and the second set of characteristics are different;

configuring the user fields to abstract, from a user, details concerning the respective set of array characteristics and details concerning whether, based on the respective set of array characteristics, any of the available automated storage tiering policies are usable with a given storage array of a given converged hardware system;

receiving, from the user, user selections, for the desired tiering policy and the desired converged hardware system, wherein, responsive to the selections, the selected automated storage tiering policy is automatically configured to cover the predetermined type of storage associated with the selected converged hardware system, and;

deploying automatically, based at least in part on the user selections of the desired tiering policy and the desired converged hardware system, a first service to run on the selected at least one converged hardware system, the first service configured in accordance with the selected respective first one of the automated storage tiering policies;

adopting the first service into the management layer; and configuring, based on the respective storage array associated with the selected convergent hardware system, an array-specific model and a set of array-specific drivers, to apply the selected tiering policy to the respective storage array.

20. The method of claim 19 wherein the automated storage tiering policies that determine a location for data based upon the relative activity level of the data are configured to assess quantity and timing of input/output operations to the data.

21. The method of claim 19 further comprising adding further storage to the converged hardware system selected by the user and selecting a tiering policy for the further storage.

\* \* \* \* \*